United States Patent
Osborne

(10) Patent No.: US 12,453,721 B2
(45) Date of Patent: Oct. 28, 2025

(54) TOPICAL ROFLUMILAST AEROSOL FOAMS

(71) Applicant: ARCUTIS BIOTHERAPEUTICS, INC., Westlake Village, CA (US)

(72) Inventor: David W. Osborne, Fort Collins, CO (US)

(73) Assignee: ARCUTIS BIOTHERAPEUTICS, INC., Westlake Village, CA (US)

( * ) Notice: Subject to any disclaimer, the term of this patent is extended or adjusted under 35 U.S.C. 154(b) by 0 days.

(21) Appl. No.: 17/821,051

(22) Filed: Aug. 19, 2022

(65) Prior Publication Data
US 2023/0201177 A1 Jun. 29, 2023

Related U.S. Application Data

(60) Provisional application No. 63/294,179, filed on Dec. 28, 2021.

(51) Int. Cl.
| | | |
|---|---|---|
| A61K 31/44 | (2006.01) | |
| A61K 9/12 | (2006.01) | |
| A61K 31/165 | (2006.01) | |
| A61K 31/17 | (2006.01) | |
| A61K 31/436 | (2006.01) | |
| A61K 31/513 | (2006.01) | |
| A61K 31/519 | (2006.01) | |
| A61K 31/52 | (2006.01) | |
| A61K 31/593 | (2006.01) | |
| A61K 31/60 | (2006.01) | |
| A61K 33/44 | (2006.01) | |
| A61K 38/13 | (2006.01) | |
| A61K 47/06 | (2006.01) | |
| A61K 47/10 | (2017.01) | |
| A61K 47/14 | (2017.01) | |
| A61K 47/24 | (2006.01) | |

(52) U.S. Cl.
CPC ............. *A61K 31/44* (2013.01); *A61K 9/122* (2013.01); *A61K 9/124* (2013.01); *A61K 31/165* (2013.01); *A61K 31/17* (2013.01); *A61K 31/436* (2013.01); *A61K 31/513* (2013.01); *A61K 31/519* (2013.01); *A61K 31/52* (2013.01); *A61K 31/593* (2013.01); *A61K 31/60* (2013.01); *A61K 33/44* (2013.01); *A61K 38/13* (2013.01); *A61K 47/06* (2013.01); *A61K 47/10* (2013.01); *A61K 47/14* (2013.01); *A61K 47/24* (2013.01)

(58) Field of Classification Search
None
See application file for complete search history.

(56) References Cited

U.S. PATENT DOCUMENTS

| | | |
|---|---|---|
| 4,482,537 A | 11/1984 | El-Menshawy et al. |
| 5,374,661 A | 12/1994 | Betlach, II |
| 5,712,298 A | 1/1998 | Amschler |
| 5,863,560 A | 1/1999 | Osborne |
| 6,056,955 A | 5/2000 | Fischetti et al. |
| 6,060,085 A | 5/2000 | Osborne |
| 6,106,848 A | 8/2000 | Preuilh et al. |
| 6,117,915 A | 9/2000 | Pereira et al. |
| 6,214,322 B1 | 4/2001 | Castro et al. |
| 6,387,383 B1 * | 5/2002 | Dow ................ A61P 29/00 514/859 |
| 7,470,791 B2 | 12/2008 | Kohl et al. |
| 7,951,398 B2 | 5/2011 | Dietrich et al. |
| 8,293,288 B2 | 10/2012 | Ma |
| 8,338,648 B2 | 12/2012 | Stock et al. |
| 8,536,206 B2 | 9/2013 | Kohl et al. |
| 8,618,142 B2 | 12/2013 | Kohl et al. |
| 9,205,044 B2 | 12/2015 | Linder |
| 9,649,302 B2 | 5/2017 | Vakkalanka |
| 9,884,050 B1 | 2/2018 | Osborne |
| 9,895,359 B1 | 2/2018 | Osborne |
| 9,907,788 B1 | 3/2018 | Osborne |
| 10,092,588 B2 * | 10/2018 | Tamarkin ........... A61K 31/58 |
| 10,105,354 B1 | 10/2018 | Osborne |
| 10,172,841 B2 | 1/2019 | Osborne |
| 10,940,142 B2 | 3/2021 | Osborne |
| 10,987,290 B2 * | 4/2021 | Wei ................ A61K 8/463 |

(Continued)

FOREIGN PATENT DOCUMENTS

| | | |
|---|---|---|
| CN | 1655782 | 8/2005 |
| EP | 1511516 | 3/2005 |

(Continued)

OTHER PUBLICATIONS https://pharmlabs.unc.edu/labexercises/compounding/aerosols/ (Year: 2021).*
https://www.brewingwithbriess.com/blog/what-is-the-color-of-foam/#:~: text=In%20Wisconsin%2C%20if%20you've,shoot%20you%20with%20a%20laser%E2%80%A6 (Year: 2023).*
HARP document (Year: 2016).*
Akhtar et al., Exploring preclinical and clinical effectiveness of nanoformulations in the treatment of atopic dermatitis: Safety aspects and patent reviews:, Bulletin of Faculty of Pharmacy, Cairo University 55 (2017), 1-10.
Bardin P et al. Roflumilast for asthma: Efficacy findings in mechanism of action studies:. Pulmonary Pharmacology & Therapeutics, vol. 35, Aug. 19, 2015, S4-S10.

(Continued)

*Primary Examiner* — Brian-Yong S Kwon
*Assistant Examiner* — Danielle Kim
(74) *Attorney, Agent, or Firm* — ROTHWELL, FIGG, ERNST & MANBECK, P.C.

(57) ABSTRACT

The present invention is directed to an aerosol foam composition comprising roflumilast, an emulsifier blend containing cetearyl alcohol, dicetyl phosphate, and ceteareth-10 phosphate and a hydrocarbon propellant. The aerosol foam composition is preferably an oil in water emulsion. The propellant is a mixture of liquefied hydrocarbon gases preferably a propane/isobutane/butane blend. The hydrocarbon propellant results in an aerosol foam which is stable, has consistent physical properties, excellent aesthetics, and no discernable degradation after long term or accelerated storage conditions.

19 Claims, 2 Drawing Sheets

(56) References Cited

U.S. PATENT DOCUMENTS

| | | |
|---|---|---|
| 11,129,818 B2 | 9/2021 | Osborne et al. |
| 11,534,493 B2 | 12/2022 | Osborne |
| 11,707,454 B2 | 7/2023 | Berk |
| 11,793,796 B2 | 10/2023 | Osborne |
| 11,819,496 B2 | 11/2023 | Osborne |
| 2005/0112162 A1 | 5/2005 | Drader |
| 2005/0244339 A1 | 11/2005 | Jauernig et al. |
| 2006/0084684 A1 | 4/2006 | Bolle |
| 2006/0153905 A1 | 7/2006 | Carrara |
| 2006/0204452 A1 | 9/2006 | Lathrop et al. |
| 2006/0204526 A1 | 9/2006 | Lathrop |
| 2006/0234006 A1 | 10/2006 | Tenra |
| 2007/0048241 A1 | 3/2007 | Obukowho et al. |
| 2007/0207107 A1 | 9/2007 | Winckle et al. |
| 2007/0259009 A1 | 11/2007 | Linder |
| 2007/0287689 A1 | 12/2007 | Harada |
| 2008/0039405 A1 | 2/2008 | Langley |
| 2008/0045572 A1 | 2/2008 | Linder |
| 2008/0280958 A1 | 11/2008 | Bolle et al. |
| 2009/0068118 A1 | 3/2009 | Eini |
| 2009/0104132 A1 | 4/2009 | Segura-Orsoni |
| 2009/0214628 A1 | 8/2009 | De Rijk |
| 2009/0220583 A1 | 9/2009 | Pereswetoff-Morath et al. |
| 2011/0117182 A1 | 5/2011 | Ahluwalia et al. |
| 2011/0212157 A1 | 9/2011 | Edelson et al. |
| 2012/0213709 A1 | 8/2012 | Tamarkin |
| 2012/0252793 A1 | 10/2012 | Bream et al. |
| 2013/0005816 A1 | 1/2013 | Chen |
| 2013/0017282 A1 | 1/2013 | Ma |
| 2013/0018104 A1 | 1/2013 | Lathrop et al. |
| 2013/0217742 A1 | 8/2013 | Yang |
| 2014/0112991 A1 | 4/2014 | Johnson et al. |
| 2014/0275265 A1 | 9/2014 | Mattison |
| 2014/0296191 A1 | 10/2014 | Patel et al. |
| 2014/0303215 A1 | 10/2014 | Bolle et al. |
| 2015/0099752 A9 | 4/2015 | Bernal Anchuela et al. |
| 2015/0297601 A1 | 10/2015 | Henkin |
| 2016/0030435 A1 | 2/2016 | Henkin |
| 2017/0152273 A1 | 6/2017 | Merchant |
| 2017/0266289 A1 | 9/2017 | Kipari |
| 2018/0353490 A1 | 12/2018 | Osborne |
| 2019/0091333 A1 | 3/2019 | Osborne |
| 2019/0175491 A1 | 6/2019 | Abraham et al. |
| 2019/0365642 A1 | 12/2019 | Osborne |
| 2020/0155524 A1* | 5/2020 | Welgus ............... A61K 9/0014 |
| 2020/0163944 A1* | 5/2020 | Osborne ............... A61K 45/06 |
| 2021/0161870 A1 | 6/2021 | Welgus et al. |
| 2021/0275509 A1 | 9/2021 | Welgus et al. |
| 2021/0386719 A1 | 12/2021 | Osborne et al. |
| 2022/0211730 A1 | 7/2022 | Osborne et al. |
| 2023/0091358 A1 | 3/2023 | Osborne et al. |
| 2023/0201177 A1 | 6/2023 | Osborne |
| 2023/0285319 A1 | 9/2023 | Osborne et al. |
| 2023/0310345 A1 | 10/2023 | Osborne et al. |

FOREIGN PATENT DOCUMENTS

| | | | |
|---|---|---|---|
| JP | 2005529930 A | 10/2005 | |
| JP | 2007533606 A | 11/2007 | |
| JP | 2011219364 A | 11/2011 | |
| WO | 9501338 | 1/1995 | |
| WO | 9810768 | 3/1998 | |
| WO | WO 2005/016296 A1 | 2/2005 | |
| WO | WO-2006073559 A1 * | 7/2006 | ............ A61C 19/066 |
| WO | WO-2007010449 A1 * | 1/2007 | ......... C11D 17/0043 |
| WO | WO-2008009616 A2 * | 1/2008 | ............... A23G 9/20 |
| WO | WO-2009069006 A2 * | 6/2009 | ............. A61K 31/19 |
| WO | 2013030789 | 3/2013 | |
| WO | 2013081565 | 6/2013 | |
| WO | 2014055801 | 4/2014 | |
| WO | 2015132708 | 9/2015 | |
| WO | 2016033308 | 3/2016 | |
| WO | 2017216738 | 12/2017 | |
| WO | 2018226584 | 12/2018 | |
| WO | 2019060379 | 3/2019 | |
| WO | 2021045804 | 3/2021 | |

OTHER PUBLICATIONS

Brown, "Treating COPD with PDE 4 inhibitors", International Journal of COPD 2007: 2(4) 517-533.

Examination Report cited in India Application No. 20194705011 dated Jul. 9, 2021. 7 pages.

Examination Report cited in India Application No. 202047016247 dated Jun. 28, 2021. 4 pages.

Final Office Action issued in U.S. Appl. No. 15/712,900 dated May 23, 2022. 14 pages.

International Search Report and Written Opinion cited in PCT/US2018/051691 dated Nov. 22, 2018, 11 pages.

International Preliminary Report on Patentability and Written Opinion cited PCT/US2018/051691 dated Mar. 24, 2020. 6 pages.

International Search Report issued in PCT/US2021/031144 dated Sep. 21, 2021. 12 pages.

Ip.com translation KR1999-0015251 A, Mar. 5, 1991, 6 pgs.

Julian N. Mayba et al. Review of Atopic Dermatitis and Topical Therapies:, Journal of Cutaneous Medicine and Surgery, BC Decker Inc. CA. vol. 21 No. 3 Dec. 27, 2016, pp. 227-236.

Karande et al., "Enhancement of transdermal drug delivery via synergistic action of chemicals", Biochimica Et Biophysica Acta, 1788 (2009), pp. 2632-2373.

Kawamatawong, Roles of roflumilast, a selective phosphodiesterase 4 inhibitor in airway diseases:, J. Thorac Dis 2017. 9(4). 1144-1154.

Kircik, L et al., Rational Vehicle Design Ensures Targeted Cutaneous Steroid Delivery. Journal of Clinical and Aesthetic Dermatology 10(2). Feb. 2017. pp. 12-19.

Lorimer, "Thermodynamics of solubility in mixed solvent systems", Pure & Appl. Chem., 1993, vol. 65, 2, pp. 183-191.

Minghetti et al., "Ex Vivo Study of Transdermal Permeation of Four Diclofenac Salts from Different Vehicles", Journal of Pharmaceutical Sciences, vo. 96, No. 4, Apr. 2007, pp. 814-823.

Nair et al., "Basic considerations in the dermatokinetics of topical formulations", Brazilian Journal of Pharmaceutical Sciences, vol. 43, No. 3, Jul./Sep. 2013, pp. 423-434.

Notification of Transmittal of the International Search Report and The Written Opinion of the International Searching Authority cited in PCT/US2020/29008 dated Jul. 6, 2020. 8 pages.

Notification of Transmittal of the International Search Report and Written Opinion cited in PCT/US2019/034640 dated Dec. 4, 2019, 10 pages.

Notification of Transmittal of the International Search Report and The Written Opinion of the International Searching Authority cited in PCT/US2021/015740 dated Apr. 23, 2021. 17 pages.

Notification of Transmittal of the International Search Report and Written Oinion of the International Searching Authority issued in PCT/US2022/013344 dated Jun. 9, 2022, 16 pages.

Notification of Transmittal of the International Search Report and Written Opinion cited in PCT/US2019/034640, dated Dec. 4, 2019, 8 pages.

Osborne, "Diethylene glycol monoethyl ether: an emerging solvent in topical dermatology products", J. Cosmet Dermatol, Dec. 2011, 10(4), pp. 324-329.

Pathan et al., "Chemical Penetration Enhancers for Transdermal Drug Delivery Systsms", Tropical Journal of Pharmaceutical Research, Apr. 2009, 8(2), pp. 173-179.

Patzelt et al., "Hair follicles, their disorders and their opportunities", Drug Discovery Today: Disease Mechanisms, vol. 5, Issue 2, Summer 2008, pp. e173-e-181.

PCT International Search Report and Written Opinion issued in PCT/US2018/0358584 on Aug. 17, 2018, 8 pages.

Pudipeddi et al., "Trends in Solubility of Polymorphs", Journal of Pharmaceutical Sciences, May 2005, vol. 94, Issue 5, pp. 929-939, Abstract only.

Shakeel et al. "Solubilization behavior of paracetamol in Transcutol—water mixtures at (298.15 to 333.15) K," Journal of Chemical & Engineering Data 58:3551-3556, 2013.

(56) References Cited

OTHER PUBLICATIONS

Sikarra et al., "Techniques for Solubility Enhancement of Poorly Soluble Drugs: An Overview", Journal of Medical Pharmaceutical and Allied Sciences, (2012), 01; pp. 1-22.
Snape et al., "A phase I randomized trial to assess the effect on skin infiltrate thickness and tolerability of topical phosphodiesterase inhibitors in the treatment of psoriasis vulgaris using a modified psoriasis plaque test", British Journal of Dermatology (2016) 175, pp. 479-486.
Special Chem "Ethoxydiglycol ," printed 2019; https://cosmetics.specialchem.com/inci/ethoxydiglycol, 5 pages.
Tradename (roflumilast) Tablets NDA 22-522, Summary of Basis for the Recommended Action from Chemistry, Manufacturing, and Controls, Forest Research Institute, Inc., Reference ID 2901509, Jul. 2009, 3 pages.
Translation Abstract. of Office Action for Chinese Patent Application No. 201810581282.7 dated Oct. 22, 2019; 13 pages.
Wikipedia "Corticosteroid," last edited Nov. 15, 2019; https://en.wikipedia.org/wiki/Corticosteroid.
Wittmann et al. "Phosphodiesterase 4 Inhibition in the Treatment of Psoriasis, Psoratic Arthritis and Other Chronic Inflammatory Diseases". Dermatol Ther(Heidelb) (2013) 3:1-15.
International Search Report and Written Opinion issued in PCT/US2022/040929 dated Dec. 8, 2022, 11 pgs.
Notification of Certification of Invalidity, Unenforceability, and/or Non-Infringement for U.S. Pat. Nos. 11,992,480; 12,005,051; 12,005,052; 12,011,437; And 12,016,848 Pursuant to § 505(j)(2)(B)(iv) of the Federal Food, Drug, and Cosmetic Act, Jul. 16, 2024, 290 pages.
Bethke et al. (2007) "Dose-Proportional Intraindividual Single and Repeated-Dose Pharmacokinetics of Roflumilast, an Oral, Once-Daily Phosphodiesterase 4 Inhibitor" *Journal of Clinical Pharmacology* 47:26-36.
Heo et al. (2010) "Topical effects of roflumilast on 1-chloro-2,4-dinitrobenzene-induced atopic dermatitis-like skin lesions in NC/Nga mice" *Pharmazie* 65:906-12.
Jin et al. (2012) "Phosphodiesterase 4 and Its Inhibitors in Inflammatory Diseases" *Chang Gung Medical Journal* 35(3):197-210.
Pleasants (2018) "Clinical Pharmacology of Oral Maintenance Therapies for Obstructive Lung Diseases" *Respiratory Care* 63(6):671-89.
Rabe (2011) "Update on roflumilast, a phosphodiesterase 4 inhibitor for the treatment of chronic obstructive pulmonary disease" *British Journal of Pharmacology* 163:53-67.
Notification of Certification of Invalidity, Unenforceability, and/or Non-Infringement for U.S. Pat. No. 12,042,487 Pursuant to § 505(j)(2)(B)(iv) of the Federal Food, Drug, and Cosmetic Act, Sep. 12, 2024, 107 pages.
Communication of a Notice of Opposition Against European Patent No. 3 634 380, Sep. 26, 2024, 22 pages.
Felton "Remington: Essentials of Pharmaceutics" London: Pharmaceutical Press (2012), 54 pages.
"Hexylene Glycol GPS Safety Summary," Arkema, Apr. 30, 2012, 5 pages.
Communication of a Notice of Opposition Against European Patent No. 3 684 334, Aug. 20, 2024, 26 pages.
Gattefosse (2015) "Efficient Skin Delivery: No Compromise With Transcutol®" https://api.semanticscholar.org/CorpusID:203610770, 17 pages.
Fenton (2012) "Handbook of Pharmaceutical Excipients" *Pharmaceutical Press* (7th Ed.), 5 pages.
Osborne (2008) "Review of Changes in Topical Drug Product Classification" *Pharmaceutical Technology* 32:10, 8 pages.
Aulton (2013) "Aulton's Pharmaceutics" *Elsevier Ltd* (4th Ed.), 20 pages.
Summons to Attend Oral Proceedings and Annex from EP 18783250.6, mailed Apr. 23, 2025.
T. Gao, et al., "Sunscreen Formulas with Multilayer Lamella Structure," Cosmetics & Toiletries, vol. 118, pp. 41-52 (Oct. 2003).

D.Y.M. Leung, et al., "New Insights into Atopic Dermatitis," J. Clin. Invest., vol. 113, pp. 651-657 (2004).
L. Kircik, "Topical Treatment Adherence for Psoriasis," Skin Therapy Letter-Family Practice Edition, vol. 4, No. 2, pp. 4 & 5 (2008).
S.R. Feldman, et al., "Psoriasis: Improving Adherence to Topical Therapy," J. Am. Acad. Dermatol., vol. 59, pp. 1009-1016 (2008).
S.M. Ali, et al., "Skin pH: From Basic Science to Basic Skin Care," Acta Derm. Venereal., vol. 93, pp. 261-267 (1-9), Tbl. SI (2013).
Study NCT01856764, "Topical Roflumilast in Adults with Atopic Dermatitis," sponsored by Takeda, available at https://clinicaltrials.gov/ (Jul. 2015).
Y. Javadzadeh, et al., "Transcutol® (Diethylene Glycol Monoethyl Ether): A Potential Penetration Enhancer," Ch. 12, pp. 195-205, in N. Dragicevic, et al., eds., Percutaneous Penetration Enhancers Chemical Methods in Penetration Enhancement: Modification of the Stratum Corneum (2015).
D.W. Osborne, et al., "Skin Penetration and Permeation Properties of Transcutol®—Neat or Diluted Mixtures," AAPS PharmSciTech, vol. 19, pp. 3512-3533 (2018).
FDA, Inactive Ingredient Guide (Jan. 1996).
M.J. O'Neil, et al., eds., The Merck Index, pp. 2822, 8379 (15th ed., 2013).
Labeling for ELOCON® (mometasone furoate) Cream (2013).
Labeling for DALIRESP® (roflumilast) Tablets (2013).
Physicians' Desk Reference, pp. 305, 748-52, 1432-35 (67th/2013 ed., 2012).
I.M. Rosenstock, "Understanding and Enhancing Patient Compliance with Diabetic Regimens," Diabetes Care, vol. 8, pp. 610-616 (1985).
J. Urquhart, "The Electronic Medication Event Monitor: Lessons for Pharmacotherapy," Clin. Pharmacokinet., vol. 32, pp. 345-356 (1997).
S.S. Zaghloul, et al., "Objective Assessment of Compliance with Psoriasis Treatment," Arch. Dermatol., vol. 140, pp. 408-414 (2004).
P. Assawasuwannakit, et al., "Quantification of the Forgiveness of Drugs to Imperfect Adherence," CPT Pharmacometrics Syst. Pharmacol., vol. 4, e4, pp. 1-8 (2015).
Office Action issued in U.S. Appl. No. 18/453,674 dated Oct. 27, 2023 (13 pages).
Office Action issued in U.S. Appl. No. 17/155,679 dated Feb. 5, 2024 (9 pages).
Office Action issued in U.S. Appl. No. 18/345,692 dated Oct. 26, 2023 (68 pages).
Office Action issued in U.S. Appl. No. 18/345,732 dated Jan. 24, 2024 (12 pages).
Office Action issued in U.S. Appl. No. 18/345,760 dated Oct. 26, 2023 (19 pages).
Office Action issued in U.S. Appl. No. 18/353,870 dated Jan. 12, 2024 (10 pages).
Office Action issued in U.S. Appl. No. 18/353,869 dated Sep. 18, 2023 (7 pages).
Notification of Certification of Invalidity, Unenforceability, and/or Noninfringement for U.S. Pat. Nos. 9,884,050; 9,907,788; 10,940,142; 11,129,818; 11,793,796; and 11,819,496 Pursuant to § 505(j)(2)(B)(iv) of the Federal Food, Drug, & Cosmetic Act, Feb. 13, 2024 (187 pages).
Notice of Panel Decision from Pre-Appeal Brief Review issued in U.S. Appl. No. 18/057,777 dated May 31, 2024 (2 pages).
Non-Final Office Action issued for U.S. Appl. No. 18/345,760 on May 8, 2025, 23 pages.
Office Action issued for U.S. Appl. No. 18/345,692 on Dec. 19, 2024, 51 pages.
Office Action issued for U.S. Appl. No. 18/345,732 on Dec. 19, 2024, 40 pages.
Office Action issued for U.S. Appl. No. 18/345,760 on Dec. 19, 2024, 43 pages.
Office Action issued for U.S. Appl. No. 17/887,798 on Dec. 19, 2024, 91 pages.
Office Action issued for U.S. Appl. No. 17/703,543 on Jan. 2, 2025, 74 pages.
Office Action issued for U.S. Appl. No. 18/335,315 on Jan. 28, 2025, 7 pages.

(56) References Cited

OTHER PUBLICATIONS

Office Action issued for U.S. Appl. No. 18/670,960 on Feb. 24, 2025, 11 pages.

\* cited by examiner

Fig. 1A Acceptable Expanding Foam
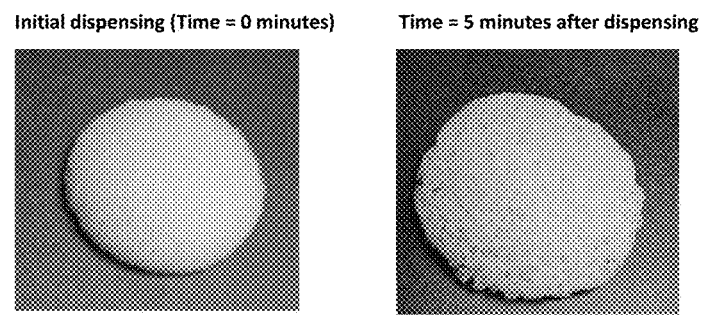
Fig. 1B Acceptable Quick Breaking Foam
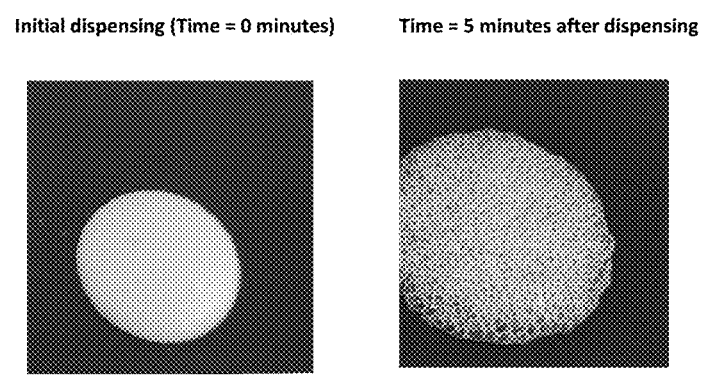
Fig. 1C Acceptable Stiff Foam
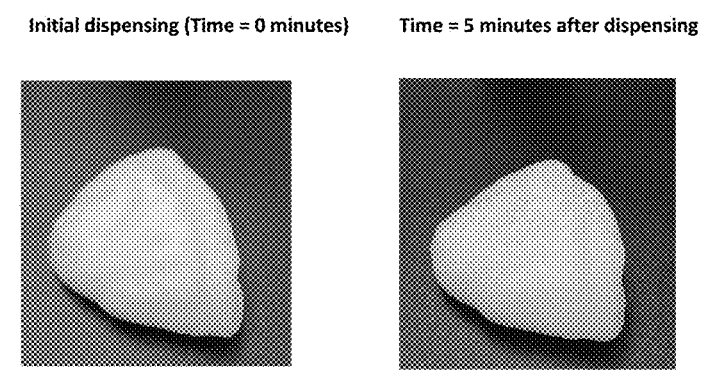

Fig. 1D Acceptable Stout Foam
Initial dispensing (Time = 0 minutes)     Time = 5 minutes after dispensing
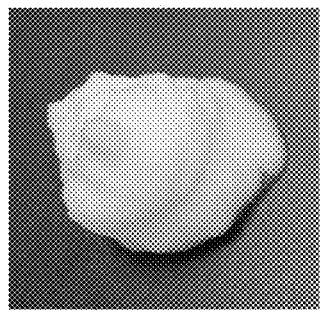
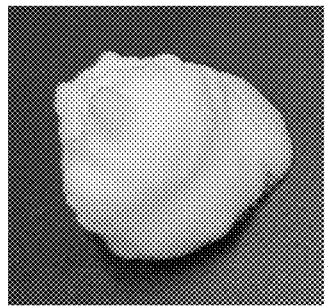
Fig. 1E Unacceptable Foam
Initial dispensing (Time = 0 minutes)     Time = 5 minutes after dispensing
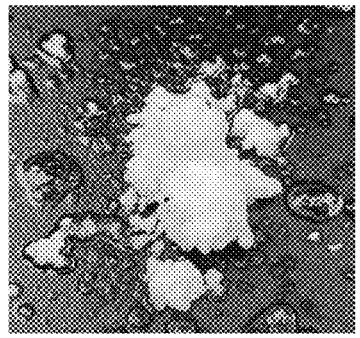
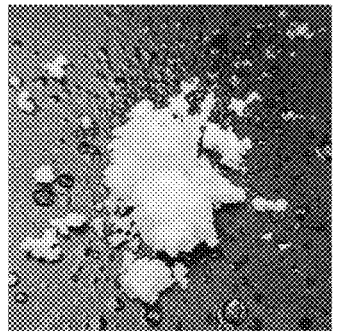

TOPICAL ROFLUMILAST AEROSOL FOAMS

FIELD OF THE INVENTION

The present invention is directed to an oil in water emulsion aerosol foam composition having an alkyl phosphate anionic surfactant or blend of alkyl phosphate surfactants as the emulsifier. More particularly, the invention pertains to a pharmaceutically acceptable emulsion aerosol foam composition comprising roflumilast, water and oil that is emulsified by a blend of cetearyl alcohol, dicetyl phosphate and ceteareth-10 phosphate (also known as ceteth-10 phosphate). The aerosol foam is dispensed using a propellant blend.

BACKGROUND OF THE INVENTION

Foam formulations have been used as a delivery system for cosmetic and pharmaceutical applications for several decades. Foams are preferred in some applications as they spread more easily and minimize rubbing. This is particularly advantageous when treating irritated skin or areas of skin which are covered by hair. Foam vehicles are preferred over ointments, gels and creams due to their ease of application, reduced stickiness and reduction in greasy feel. Patient preference for foam vehicles can lead to increased patient compliance and thus better treatment results.

There are different kinds of foam formulations which can be used to deliver active ingredients, including aqueous, hydroalcoholic, emollient, solvent based, petrolatum based and oil based foams. The different formulations have different characteristics, for example, emollient foams have a soothing, moisturizing effect and hydroalcoholic foams promote skin penetration and solubility of the active agents. The foam can be made using a propellant-free generation method such as the AIRSPRAY® foam dispenser (foam dispenser having a pump assembly which includes a liquid pump, an air pump and a common actuation part to simultaneously actuate the liquid pump and the air pump) or by using a pressurized container and a propellant.

Topical foams differ from ointments and creams in that the characteristics of the foam vehicle change. Prior to application, the foam formulation is usually in the form of a suspension or emulsion. When an aerosol foam formulation is discharged from the container, the liquid propellant volatilizes producing a semi-solid foam product that is expanded with gas phase propellant. If a propellant-free generation method is used, air is simultaneously pumped into the suspension or emulsion as the foam is being dispensed. The method used to generate the foam affects the foam appearance and stability.

Foams can be designed to have specific properties depending on factors such as the condition being treated, the area of the body being treated, and the active pharmaceutical ingredient in the formulation. The foam vehicle should have suitable stability so that it does not collapse after discharge from the container; low shear sensitivity so that only minimal rubbing is required; should be non-irritating, non-allergenic, and non-toxic; and should keep the active pharmaceutical agent solubilized. Additionally, aerosol foam vehicles should contain a propellant that has minimal or no impact on the ozone layer of the atmosphere. Foams applied to the face or upper front torso should have minimal odor, since addition of fragrances to cover malodor is not preferred for pharmaceutical products. Foam structure is affected by various parameters including the type and concentrations of the components, the viscosity of the liquid phase, the salt concentration, the temperature and the pH of the formulation.

Commercializable three phase pharmaceutical aerosols rely on surfactants that have limited solubility in both the internal oil and external aqueous phases. Upon shaking, the liquid hydrocarbon propellant mixes with the dispersed globules of the oil phase. The surfactants concentrate at the interface between the propellant/oil phase and the aqueous phase to form a thin film referred to as the "lamella." It is the specific composition of this lamella that dictates the structural strength and general characteristics of the foam that forms when the liquid propellant in the internal phase transitions into a gas as soon as pharmaceutical emulsion leaves the pressurized environment of the aerosol canister. This liquid to gas phase transition forms the bubbles of the foam. Thick and tightly layered lamellae produce very structured foams that can support their weight. Stable foams cannot always be formed. The formation of a stable foam with the desired structure depends on many factors including but not limited to the specific components, the concentrations of the components, the viscosity of the liquid phase, and the propellant. These factors can be adjusted to produce stable foams with different structures such as expanding foams, quick breaking foams, stiff foams, and stout foams.

Foam collapse occurs when the pressure generated by the expanding internal gas phase exceeds the cohesive strength of the foam lamella. Three sources of an expanding internal gas phase are: 1) additional degassing of the lower vapor pressure liquid hydrocarbon propellant, 2) mechanical pressure (pushing) on the foam during rub-in, and 3) general warming of the foam to ambient (20-25° C.) or skin (32° C.) temperature following adiabatic cooling of the foam concentrate (70 psig) as it passes through the valve and becomes a foam at ambient pressures. For a three phase emulsion pharmaceutical foam stabilized by alkyl phosphate surfactants, once the lamella is reduced to a single surfactant bilayer film, additional expansion of the internal gas phase will case rupture of the foam cell and drainage of the product onto the skin surface.

Expanding foams and quick breaking foams are characterized by the expanding internal gas phase quickly causing the lamella to rupture to create visibly larger foam cells. The expanding foam will appear to initially "puff up" as the internal foam cells combine, but as the foam cells on the surface collapse, drainage of the product will deliver the active to the skin application site.

For stiff foams and stout foams, the fully degassed internal phase warmed to skin temperature does not generate sufficient pressure to exceed the cohesive strength of the lamella. The gas cells do not rupture until the added pressure of rub-in occurs. These more stable foams are ideal for scalp application because the foam can be placed against the scalp lesions in a "part of the hair" and then rubbed-in to break the foam and apply the active agent to diseased skin with minimum loss of product to the hair.

For three phase pharmaceutical emulsion foams to be commercially acceptable, the liquid hydrocarbon propellant must mix properly with the internal oil phase of the emulsion in order to form a foam when the product leaves the canister. If the propellant does not properly mix, then only a few foam cells will form when the liquid propellant transitions into gas and the majority of the propellant will transition into a gas outside of the emulsion when actuated. When shaken and immediately actuated through the valve an unacceptable "sputtering" foam that is non-uniform and very dense will be dispensed. Since propellant separate from the emulsion concentrate is dispensed even though the canister is properly shaken and inverted, the propellant will empty from the canister prior to expelling the entire amount of product. This foam product is commercially unacceptable due to incomplete emptying of the canister. For example if a prescription product is labeled to deliver 60 grams of foam (a one month supply), but the propellant is completely exhausted after delivering 48 grams of foam, the patient will not receive the full, prescribed treatment. Such a foam canister would fail the requirement for minimum delivered mass and would be recalled from the market.

Stable foams cannot always be formed. The formation of a stable foam with the desired structure depends on many factors including but not limited to the specific components, the concentrations of the components, the viscosity of the liquid phase, and the propellant. Any excipient added to the formulation that increases the solubility of the surfactant into the external aqueous phase will destabilize the emulsion, reduce the stiffness of the lamella and result in the foam bubbles rupturing as soon as the liquid propellant transitions into a gas. In other words, a fluid emulsion would be dispensed from the canister that quickly flows away from the skin application site rather than forming a topical foam that remains at the application site until rub-in breaks the lamella and releases the drug product to the desired treatment site.

The cosmetic and pharmaceutical solvent diethylene glycol monoethyl ether (DEGEE) has been shown to reside in the aqueous continuous phase of emulsions and increase the solubility of surfactants and waxy components of the lamella into the continuous aqueous phase during the emulsification process (Hernandez, et al., Journal of Dispersion Science and Technology, Investigating the effect of transcutol on the physical properties of an O/W cream, Vol 41, No. 4, pp 600-606, 2020). The dramatic destabilization of a polyoxyethylene-20-stearyl ether and polyoxyethylene-2-stearyl ether emulsion when the DEGEE concentration was increased above 25% suggests that maintaining sufficiently thick and tightly layered lamellae to produce a stable foam in the presence of 25% or more DEGEE would be surprising.

Foam stability can be evaluated by determining the foam half-life. Foam half-life is the time required for half the volume of the liquid continuous phase of the foam product to drain. The shorter the half-life, the lower the foam stability. The desired foam half-life would be based on the intended use of the foam. For certain foam applications where the foam is applied over large areas of the body surface (for example self tanning foams and sun screen foams), foam half-lives are preferred to be less than 30 seconds to minimize the application time. For the topical pharmaceutical foams of the present invention, a foam half-life of greater than 30 seconds is desirable and a foam half-life of greater than one minute is preferred.

Aerosol foams have been found to produce a stable foam which is suitable for topical application of active pharmaceutical ingredients (API). An aerosol foam formulation consists of two components: the product concentrate and the propellant. The product concentrate is the active drug combined with additional ingredients or co-solvents required to make a stable and efficacious product. The concentrate of a pharmaceutical aerosol formulation can be a solution, suspension, emulsion, semisolid, or powder. Topical foam products usually have an emulsion product concentrate. The propellant provides the force that expels the product concentrate from the container and additionally is responsible for the delivery of the formulation as a foam. The propellant can also serve as a solvent for the pharmaceutical actives or functional excipients that make up the product concentrate reducing the need for additional solvents.

Propellants

A propellant is used to create pressure within a container and expel a product concentrate from the container. Propellants are chemicals with a vapor pressure greater than atmospheric pressure at 40° C. (105° F.). Pharmaceutical aerosols are commonly made using propellants such as chlorofluorocarbons, fluorocarbons (trichloromonofluoromethane, dichlorodifluoromethane), hydrocarbons (propane, butane, isobutane), hydrochlorofluorocarbons and hydrofluorocarbons, and compressed gases (nitrogen, $NO_2$, $CO_2$).

Chlorofluorocarbon (CFCs) propellants have been used for many years, however, due to their role in depleting the ozone layer, the use of CFCs has been significantly reduced.

Hydrochlorofluorocarbons (HCFCs) and hydrofluorocarbons (HFCs) differ from CFCs in that they may or may not contain chlorine and have one or more hydrogen atoms. HCFCs and HFCs have a lower impact on the ozone layer as they break down in the atmosphere at a faster rate than the CFCs. HCFCs and HFCs are used in topical pharmaceuticals. HCFCs and HFCs have a greater miscibility with water and therefore are more useful as solvents compared to the other propellants. For foam concentrates that consist of oil-in-water emulsions, HCFCs and HFCs readily blend with the continuous phase of the emulsion and provide excellent topical drug delivery vehicles for highly water-soluble actives, such as urea and salicylic acid. KERAFOAM® 42 Emollient Foam is a keratolytic emollient foam which is a tissue softener for skin and/or nails that contains preservatives, buffering agents, water, ceteareth-10 phosphate, cetearyl alcohol and dicetyl phosphate. SALKERA® Emollient Foam is a keratolytic that contains 6% salicylic acid USP incorporated into an aqueous based emollient foam vehicle that contains moisturizers, preservatives, buffering agents, water, ceteareth-10 phosphate, ceteareth-20 phosphate, cetostearyl alcohol, dicetyl phosphate and propylene glycol.

Hydrocarbon (HCs) propellants are used in topical pharmaceutical aerosols because of their lower environmental impact, their low toxicity and their nonreactivity. HCs are also useful in making three phase (two layer) aerosols because their density is less than 1 and they are immiscible with water. The hydrocarbons remain on top of the aqueous layer and provide the force to push the contents out of the container. They contain no halogens and therefore hydrolysis does not occur making these good propellants for water based aerosols. Unfortunately, hydrocarbon propellants are flammable and can explode. The flammability can be reduced by mixing the hydrocarbons with other liquefied gases. The liquid hydrocarbon propellants inside the canister can poorly mix with the internal oil phase of the oil-in-water emulsion and destabilize the foam concentrate. This results in a lack of content uniformity for the emitted doses from the canister.

TABLE 1

Properties of Hydrocarbon Propellants

| Name | Formula | No. | V.P. @70° F. (psia) | B.P. ° F. (1 atm) | Liquid Density @68° F. (g/mL) |
|---|---|---|---|---|---|
| Propane | $C_3H_8$ | A-108 | 124.7 | −43.7 | 0.50 |
| Isobutane | $C_4H_{10}$ | A-31 | 45.1 | 10.9 | 0.56 |
| Butane | $C_4H_{10}$ | A-17 | 31.2 | 31.1 | 0.58 |

Propane, butane, and isobutane are the most commonly used hydrocarbons. They are used alone or as mixtures to obtain the desired vapor pressure, density, and degree of flammability. Blends of propane, iso-butane and n-butane are usually designated as "AP" or "NIP" followed by a dash and number that is the pounds per square inch pressure (as determined with a pressure gauge) for the particular propellant blend at 70° F. For example, the AP-48 propellant is a 31:23:46 Propane:Isobutane:Butane blend that results in 48 psig in the can at 70° F. while the AP-70 propellant is a 55:15:30 Propane:Isobutane:Butane blend that results in 70 psig in the can at 70° F.

Inert and compressed-gas propellants expel the product concentrate in essentially the same form as it was placed into the container. The pressure of the compressed gas is in the headspace of the aerosol container. Compressed gas propellants are readily available, cheap and nonflammable, however, the pressure in the can is reduced as the product is used up. For pharmaceutical products this steady decrease in pressure with each actuation can result in the first dose of active delivered being significantly different than the last dose of active delivered from the canister. Also, once the compressed gas is depleted, any remaining product in the canister cannot be administered to the patient. For these reasons compressed-gas propellants are typically not used for pharmaceutical aerosols.

Product Concentrates

An aerosol foam is produced when an oil in water emulsion product concentrate is mixed with a propellant and the propellant is in the internal oil phase of the emulsion. If the propellant is in the external phase (i.e., like a water in oil emulsion), foams are not created but sprays or wet streams result. A quick breaking foam creates a foam when emitted from the container but the foam collapses in a relatively short time. This type of foam is used to apply the product concentrate to a large area without having to manually rub or spread the product. The active drug is more rapidly available because the foam quickly collapses. Stable foams are produced when surfactants are used that have limited solubility in both the organic and aqueous phases. Surfactants concentrate at the interface between the propellant/oil phase and the aqueous phase to form a thin film referred to as the "lamella." It is the specific composition of this lamella that dictates the structural strength and general characteristics of the foam. Thick and tightly layered lamellae produce very structured foams which are capable of supporting their own weight.

The emulsifier or surfactant used to formulate the product concentrate and the use of alcohol in the formulation are two of the most important components in a topical pharmaceutical foam. Surfactants in emulsion aerosols can include fatty acids saponified with triethanolamine, anionic surfactants, and more recently nonionic surfactants such as the polyoxyethylene fatty esters, polyoxyethylene sorbitan esters, alkyl phenoxy ethanols, and alkanolamides. The first dermatological foams contained high levels of alcohol (~60% ethanol) and used the nonionic surfactant Polysorbate 60 and hydrocarbon propellants to create a quick breaking foam. The topical foams Olux® (clobetasol), Luxiq® (betamethacone), Lexette® (halobetasol) and Evoclin® (clindamycin) are high alcohol foams. Unfortunately, high alcohol foams were found to sting and burn for some psoriasis patients, and alcohol was removed from the clobetasol foam and Polysorbate 60 was replaced with polyoxyl 20 cetostearyl ether to launch the first emollient topical pharmaceutical foam Olux-E®. Finacea® topical foam has a very similar composition to Olux-E® since it contains Propylene glycol but no alcohol and uses the surfactant blend of polysorbate 80 and polyoxyl 40 stearate to form the foam lamella. The latest advance in topical pharmaceutical foam technology is Amzeeq® topical minocycline foam for the treatment of acne and rosacea. This product does not contain solvents but uses a blend of multiple natural oils to dissolve minocycline combined with hydrogenated castor oil as the surfactant to form foam lamella.

BRIEF SUMMARY OF THE INVENTION

The present invention is directed to an aerosol foam composition comprising roflumilast. The aerosol foam composition is preferably an oil in water emulsion in combination with a propellant. The propellant is a mixture of liquefied hydrocarbon gases preferably a propane/isobutane/butane blend. The hydrocarbon propellant results in a roflumilast aerosol foam which is stable, has consistent physical properties, excellent aesthetics, and no discernable roflumilast degradation after long term (storage at ambient temperature for more than 24 months) or accelerated storage conditions (storage at 40° C. and 75% relative humidity for 6 months). Preferably, the roflumilast aerosol foam does not contain alcohol or propylene glycol.

BRIEF DESCRIPTION OF THE DRAWINGS

FIGS. 1A-1E show acceptable and unacceptable foams. FIGS. 1A-1D show acceptable foam structures including an expanding foam, a quick breaking foam, a stiff foam and a stout foam immediately after dispensing and 5 minutes after dispensing. FIG. 1E shows an unacceptable foam with inadequate mixing of the propellant and the concentrate, resulting in sputtering during dispensing.

DETAILED DESCRIPTION OF THE INVENTION

Topical application of potent pharmacological agents like roflumilast for treating skin diseases has been found to provide superior delivery, lower systemic exposure and greater ease of use for patients. The molecular structure of the compound ultimately dictates the ability of the drug to cross the epithelium of the tissue to which the product is applied. For cutaneous application, selection of the components of the formulation dictates the maximum skin permeation that the formulator can achieve. Creams, lotions, gels, ointments, aerosol foams and solutions are just a few of the more familiar forms of topical roflumilast formulations that often contain completely dissolved active pharmaceutical ingredients (API) for application to the skin as disclosed in U.S. Pat. No. 5,712,298 (the "'298 patent"), incorporated herein by reference (col 12, lines 37-64). For treatment of such dermatoses, roflumilast emulsions, suspensions, gels or solutions for topical application have been described, although the low solubility of the compound has limited those applications.

The composition preferably contains roflumilast, salts of roflumilast, the N-oxide of roflumilast or salts thereof in an amount of 0.005-2% w/w, more preferably 0.05-1% w/w, and most preferably 0.1-0.5% w/w per dosage unit. A 0.3% roflumilast cream (ARQ-151) formulation, which is an oil-in-water emulsion that had already been shown to be effective and well-tolerated for the treatment of plaque psoriasis, was combined with a propellant. The roflumilast foam concentrate was formulated to produce a foam which does not collapse after discharge from the container; has low shear sensitivity so that only minimal rubbing is required; is non-irritating, non-allergenic, and non-toxic; and keeps the roflumilast solubilized. Additionally, the roflumilast aerosol foam vehicle contains a propellant that has minimal or no impact on the ozone layer of the atmosphere. The components in the roflumilast foam concentrate and the propellants can be adjusted to produce foams with different properties such as expanding foams, quick breaking foams, stiff foams and stout foams. Preferably, the product expressed from the canister is a smooth white or off-white foam having uniform bubbles which are able to support their own weight until initiation of rub-in. As soon as rub-in is initiated the foam quickly breaks to evenly spread across the application site. The product preferably has a foam half-life of more than 60 seconds. The amount of the foam dispensed by the canister may or may not be metered to dispense a consistent amount of the foam and a consistent dosage of roflumilast.

The roflumilast aerosol foam includes 1-5%, preferably 2%, of an emulsifier containing an alkyl phosphate anionic surfactant or blend of alkyl phosphate surfactants to ensure mixing with the propellant. Emollients are included in amounts which produce an aesthetically pleasing foam. Preferably, the emollients include 2-6%, preferably 5%, petrolatum; and 2-3%, preferably 2.5%, isopropyl palmitate.

The propellant provides the force that expels the product concentrate from the container and additionally is responsible for the delivery of the formulation as a foam. Since the roflumilast aerosol foam propellant is a mixture of liquefied hydrocarbon gases, it can also serve as a solvent for roflumilast or can be mixed with the internal oil phase of the emulsion of the product concentrate. The use of a hydrocarbon propellant may reduce or eliminate the need for additional solvents such as hexylene glycol and DEGEE (diethylene glycol monoethyl ether). Hexylene glycol is preferably in an amount of 0-20% w/w and DEGEE is preferably in an amount of 10-35% w/w. The hydrocarbon propellant partially mixes with the roflumilast concentrate, but primarily forms a separate liquid layer (lower density than the concentrate) inside the can. This is commonly referred to as a three-phase pharmaceutical aerosol. Thus, it is necessary to shake the can to evenly distribute the propellant throughout the finished product prior to applying the emitted foam to the skin of the patient.

The final composition of the 0.3% roflumilast foam is given in Table 2. The roflumilast emitted foam product having this composition has consistent physical properties, excellent aesthetics, no discernable roflumilast degradation after long term (storage under ambient conditions for 24 or more months) or accelerated storage (storage at 40° C. and 75% relative humidity for 6 months) conditions and during development showed acceptable but variable roflumilast assay results. A series of quality by design experiments focused on the analytical method of sample preparation, optimization of the product concentrate and characterization of packaging compatibility were completed. It was determined that variability in assay results could be minimized by including a hexane extraction during sample preparation.

TABLE 2

Composition of ARQ-154 foam product.

| Ingredient | Concentration in ARQ-154 Concentrate |
|---|---|
| Roflumilast | 0.3% w/w |
| DEGEE (Transcutol P) | 25% w/w |
| Petrolatum | 5.0% w/w |
| Isopropyl Palmitate | 2.5% w/w |
| CRODAFOS ™ CES | 2.0% w/w |
| --cetearyl alcohol | NMT 1.6% w/w |
| --dicetyl phosphate | NMT 0.4% w/w |
| --ceteareth-10 phosphate | NMT 0.4% w/w |
| Hexylene Glycol | 2% w/w |
| Methylparaben | 0.2% |
| Propylparaben | 0.05% |
| Purified Water | q.s. ad 100% |
| Propane/Isobutane/Butane Blend (AP-70 or AP-48) | NA* |
| pH modifier** | q.s. ad pH 5.5 |

*8-10 grams of propellant is added to 64 grams (target) of the emulsion concentrate to deliver a minimum 60 grams of foam product
**1N NaOH or 10% HCl if needed to adjust pH Product Concentrate The product concentrate in the roflumilast foam consists of an oil-in-water emulsion of the active ingredient roflumilast, approximately 90% water miscible continuous phase, 7.5% oil phase (blend of the moisturizers petrolatum and isopropyl palmitate), and 1-5%, preferably 2-4%, more preferably 2% of the anionic surfactant based emulsifying wax Crodafos CES or Crodafos CES-PA (PA indicates that the palm kernel oil starting material is from a sustainable source). These components produce a quick breaking foam of roflumilast for treatment of the scalp and face. A quick breaking foam is a formulation that forms a foam when emitted from the container, but the foam collapses in a relatively short time after application (rub-in) to the skin. This type of foam is used to apply the product concentrate to a large area without having to manually rub or spread the product. The active drug is more rapidly available because the foam quickly collapses and foams are more easily applied to skin areas having a high density of terminal hairs, i.e. the scalp. A pH modifier is added prior to emulsification to adjust the pH which should not exceed the pH=6 upper specification limit for the final product. Preferred pH modifiers include NaOH and HCl. The viscosity values for a range of Crodafos CES concentrations having 10% petrolatum and 5% IPP as the oil phase is given in Table 3. Note that the 10% Crodafos CES is in a roflumilast cream product and is not suitable for use in an aerosol foam as the foam "sputtered" when emitted from the can. Sputter (represented in FIG. 1E) indicates inadequate mixing between the liquid propellant and emulsion foam concentrate inside the canister. Preferred viscosities are between 4000-11,000 centipoise (cP). The viscosity was tested using a Brookfield Viscometer which determines the viscosity by measuring the force to turn the spindle in the sample at a given rate. A regular viscosity spring (RV) was used with a #14 spindle at 30 rpm, sample chamber 6R. However, any digital viscometer (DVE, DV1, DV2, or DV3) is suitable for determining viscosity. The time to read was 2 minutes and the temperature was controlled room temperature (CRT, 20-25° C.).

TABLE 3

Viscosity values for varying levels of Crodafos CES in the ARQ-151 cream formulation.

| Sample | % Crodafos CES | Viscosity (cP) | Appearance |
|---|---|---|---|
| 2017-014-95-18 | 10 | 29130 | Smooth, Thick White Cream |
| 2107-014-95-38A | 8 | 10750 | Smooth, White Cream |
| 2107-014-95-38B | 6 | 9290 | Smooth, White Cream |
| 2107-014-95-38C | 4 | 6330 | Smooth, White Cream |
| 2107-014-95-38D | 2 | 4190 | Smooth, Thin White Cream |

The preferred aesthetics of the roflumilast foam concentrate were obtained by reducing the emollients by half (5% rather than 10% for petrolatum and 2.5% rather than 5.0% for isopropyl palmitate). Only two 2% Crodafos CES foam concentrate formulations were compared regarding the aesthetics of the roflumilast foam formulation. The foam concentrate having 15% combined moisturizers felt "oily" during rub-in compared to the foam concentrate containing 7.5% combined moisturizers. Since the roflumilast foam product was formulated to treat the scalp and facial seborrheic dermatitis skin (both anatomical sites known to have oily skin prior to foam application), it was considered an aesthetic advantage to reduce the moisturizer content of the foam compared to the cream. To compensate for the removal of 15.5% of the emulsifier/emollients, the amount of water in the foam was increased to just over 65% in the foam concentrate compared to ~50% water in the roflumilast cream. Three months of informal stability data for 64 grams product concentrate formulation (Table 2) gassed with 8 grams of AP-70 propellant is shown in Tables 4 and 5.

TABLE 4

Stability Data for ARQ-154 Foam 0.3%, Lot 1610-1220N01 stored at 25° C. Inverted

| | Test | | | |
|---|---|---|---|---|
| | T = 0 | T = 1 MO | T = 2 MO | T = 3 MO |
| Description* | Meets | Meets | Meets | Meets |
| pH | 5.44 | 5.26 | 5.29 | 5.29 |
| Pressure @ 25° C. | 58 psi | 75 psi | 65 psi | 73 psi |
| Delivery Rate @ 25° C.** | 1.64 g/sec | 2.18 g/sec | 2.38 g/sec | 1.91 g/sec |
| Foam Density | 0.091 g/mL | 0.112 g/mL | 0.104 g/mL | 0.104 g/mL |
| ^Assay roflumilast | 99.0% | 99.9% | 97.0% | 99.4% |
| ^Assay methylparaben | 99.7% | 99.6% | 100.2% | 98.1% |
| ^Assay propylparaben | 99.7% | 99.3% | 99.5% | 98.4% |

^Assay % label claim results are the average value of n = 9 replicates for each test and timepoint, normalized against the bulk formulation concentrate.
*Description: White, opaque, foam with small, compact bubbles. Foam is not runny.
**(Average Delivery Rate grams/second): Method: USP 603

TABLE 5

Stability Data for ARQ-154 Foam 0.3%, Lot 1610-1220N01 stored at 40° C. Inverted

| | Test | | | | |
|---|---|---|---|---|---|
| | T = 0 | T = 1 MO | T = 2 MO | T = 3 MO | T = 6 MO |
| Description* | Meets | Meets | Meets | Meets | Meets |
| pH | 5.44 | 5.31 | 5.34 | 5.38 | 5.28 |
| Pressure @ 25° C. | 58 psi | 70 psi | 65 psi | 70 psi | NT |
| Delivery Rate @ 25° C.** | 1.64 g/sec | 2.20 g/sec | 2.28 g/sec | 1.64 g/sec | NT |
| Foam Density | 0.091 g/mL | 0.110 g/mL | 0.100 g/mL | 0.092 g/mL | NT |
| ^Assay roflumilast | 99.0% | 96.1% | 93.4% | 94.8% | 98.1% |
| ^Assay methylparaben | 99.7% | 99.3% | 99.5% | 97.3% | 96.1% |
| ^Assay propylparaben | 99.7% | 98.8% | 98.9% | 97.8% | 97.1% |

NT = Not Tested
^Assay % label claim results are the average value of n = 9 replicates for each test and timepoint, normalized against the bulk formulation concentrate.
*Description: White, opaque, foam with small, compact bubbles. Foam is not runny.
**(Average Delivery Rate grams/second): Method: USP 603

Propellants

A hydrocarbon propellant has been found to result in a roflumilast foam with the desired properties. They contain no halogens and therefore hydrolysis does not occur making these good propellants for water-based aerosols such as an oil in water emulsion comprising roflumilast. In addition to acting as a propellant, the hydrocarbon propellant can also act as a solvent potentially reducing the amount of additional solvents required to produce an efficacious and aesthetically acceptable foam. The specific hydrocarbons used and the ratio of the propellant to the emulsion affects the density and the stability of the aerosol foam.

Seven different hydrocarbon propellants and one N-Butane/dimethyl ether blend were screened with the Crodafos CES emulsion concentrate as a first development step in formulating an aesthetically acceptable roflumilast foam. The seven hydrocarbon propellants were Isobutane (A-31), N-Butane (A-17), Propane/Isobutane (A-46), Propane/Isobutane (A-70), Propane/Isobutane/N-Butane (AP-70), Aeropin 35 (Aeropin 35 is a blend of Propane/Isobutane/N-Butane having a vapor pressure of 35 psig at 70° F. such as the ratio of Isobutane to N-Butane is fixed at 2/3) and Butane 48 (Butane 48 is a 30.8/22.9/45.8/0.5 ratio of Propane/Isobutane/N-Butane/Isopentane). The hydrocarbon blend with dimethyl ether (DME) was 53% DME and 47% N-Butane. The AP-70 propellant produced the best quality foam in the initial roflumilast foam propellant screening study. Table 1 (shown above) provides the properties of the three hydrocarbon propellants that are blended to create the “AP” designated aerosol propellants.

The aesthetics of ARQ-154 foam formulation shown in Table 2 (64 grams concentrate) when gassed with 8 grams of either AP-48 or AP-70 propellant were compared. The AP-48 propellant is a 31:23:46 Propane:Isobutane:Butane blend while AP-70 propellant is a 55:15:30 blend of the same hydrocarbons. While both foams were found completely acceptable, the firmer appearance and slightly slower breaking of the AP-48 propellant foam was preferred by about two-thirds of the individuals testing the products. The other third of the testers had either no preference or a slight preference for the quicker breaking AP-70 foam. It was concluded that both the AP-48 and AP-70 hydrocarbon blends show good topical foam characteristics and excellent aesthetics. By adjusting the ratio of propane to the butanes, any pressure between 48 and 70 psig can be achieved. In terms of aesthetics, any ratio of the hydrocarbon propellant blend of Propane/Isobutane/N-Butane that gives a pressure around 48-70 psig at 70° F. has been shown acceptable.

The Roflumilast Foam Product

An aerosol foam is produced when the oil in water emulsion product concentrate is mixed with the liquid hydrocarbon propellant and the propellant is in the internal oil phase. If the propellant is in the external phase (i.e., like a water-in-oil emulsion), foams are not created but sprays or wet streams result. Stable foams are produced when surfactants are used that have limited solubility in both the internal oil and external aqueous phases. Surfactants concentrate at the interface between the propellant/oil phase and the aqueous phase to form a thin film referred to as the “lamella.” It is the specific composition of this lamella that dictates the structural strength and general characteristics of the foam. Thick and tightly layered lamellae produce very structured foams which can support their own weight. In a preferred embodiment, two alkyl phosphate surfactants are used which are not commonly used in a topical foam product. These alkyl phosphate surfactants are in the emulsifier Crodafos CES.

For all topical pharmaceutical foams, it is assumed that all propellant is released from the formulation when the last lamella ruptures (foam bubble breaks). The specific composition of the foam lamella dictates the structural strength and general characteristics of the foam. The liquid crystal stabilized oil-in-water emulsion roflumilast concentrate has multiple Crodafos CES lamella surrounding each oil droplet. The solvent DEGEE (diethylene glycol monoethyl ether) is both water and oil miscible, thus it is likely partitioned between the oil and water phases and distributed within the multiple lamella at the interface of the emulsion. The concentrate is added to the can, the valve crimped into place on the top of the can and the propellant added under pressure through the valve of the primary container closure system. Within the can, some of the liquid propellant partitions into the oil phase. When the can is shaken, the propellant readily mixes with the oil droplets of the concentrate to form a milky white, emulsion in the can. As the propellant transitions from a liquid under pressure to a gas when emitted from the can, the volume of liquid propellant resident within the oil globule rapidly expands to become the hydrocarbon gas bubble trapped within the lamella of the foam. As the propellant expands, the multiple lamella of the droplet quickly becomes the single lamella of the foam. Once the pressure associated with the volume of gaseous propellant exceeds the strength of the surfactant lamella, the foam cell breaks and roflumilast concentrate drains to the surface of the skin.

Different hydrocarbon blends can be used in the propellant to change the properties of the foam. For example, the AP-70 propellant contains more propane to produce a higher-pressure propellant bubble, and thus should make slightly larger foam bubbles. The AP-70 propellant should also cause the foam bubbles to expand somewhat after the foam comes out of the can and be a little “faster breaking” than a roflumilast foam having the lower pressure AP-48 as the propellant. The firmer appearance and slightly slower breaking of the AP-48 propellant foam was preferred in a side-by-side comparison of vehicle foams gassed with either the AP-48 or AP-70 propellants. Both the AP-48 and AP-70 hydrocarbon blends show good topical foam characteristics and excellent aesthetics.

Compositions according to the present invention may be formulated with additional components such as fillers, carriers and excipients conventionally found in cosmetic and pharmaceutical topical products. Additional components including but not limited to preservatives (e.g. p-hydroxybenzoic esters, benzyl alcohol, phenylmercury salts, chlorocresol), antioxidants, sequestering agents, stabilizers, buffers, pH modifiers, skin penetration enhancers, film formers, dyes, pigments, diluents, bulking agents, fragrances and other excipients to improve the stability or aesthetics, may be added to the composition.

Compositions according to the present invention may be formulated with additional active agents depending on the condition being treated. For example, when proliferative, inflammatory and allergic dermatoses are treated, the additional active agents may include but are not limited to Anthralin (dithranol), Azathioprine, Tacrolimus, Coal tar, Methotrexate, Methoxsalen, Salicylic acid, Ammonium lactate, Urea, Hydroxyurea, 5-fluorouracil, Propylthouracil, 6-thioguanine, Sulfasalazine, Mycophenolate mofetil, Fumaric acid esters, Corticosteroids (e.g. Aclometasone, Amcinonide, Betamethasone, Clobetasol, Clocotolone, Mometasone, Triamcinolone, Fluocinolone, Fluocinonide, Flurandrenolide, Diflorasone, Desonide, Desoximetasone, Dexamethasone, Halcinonide, Halobetasol, Hydrocortisone, Methylprednisolone, Prednicarbate, Prednisone), Corticotropin, Vitamin D analogues (e.g. calcipotriene, calcitriol), Acitretin, Tazarotene, Cyclosporine, Resorcinol, Colchicine, Adalimumab, Ustekinumab, Infliximab, bronchodialators (e.g. beta-agonists, anticholinergics, theophylline), and antibiotics (e.g. erythromycin, ciprofloxacin, metronidazole).

The roflumilast can be encapsulated to control the release rate from the composition and to protect the roflumilast from degradation. Encapsulation can also be used to modify skin penetration. Methods for encapsulating active pharmaceutical ingredients are known in the art and include but are not limited to encapsulation in liposomes, microparticles, nanoparticles, nanocarriers, nanospheres, microspheres, microcapsules, nanocapsules, nanosponges, and microsponges.

The foam composition can be administered on a schedule appropriate for the condition being treated, preferably the foam composition is administered one or more times per day, more preferably the composition is administered 1-2 times per day.

The composition can be used in veterinary and in human medicine for the treatment and prevention of all diseases regarded as treatable or preventable by using roflumilast, including but not limited to proliferative, inflammatory and allergic dermatoses; disorders which are based on an excessive release of TNF and leukotrienes; disorders of the eye; arthritic disorders; and disorders which can be treated by the tissue-relaxant action of PDE inhibitors. Preferably, the composition is used to treat proliferative, inflammatory and allergic dermatoses such as psoriasis (vulgaris), eczema, acne, lichen simplex, lichen sclerosus, prurigo nodularis, sunburn, pruritus, alopecia areata, hypertrophic scars, discoid lupus erythematosus, and pyodermias.

The following examples are provided to enable those of ordinary skill in the art to make and use the methods and compositions of the invention. These examples are not intended to limit the scope of what the inventor regards as the invention. Additional advantages and modifications will be readily apparent to those skilled in the art.

EXAMPLES

Example 1

TABLE 6

| Foam Concentrate Composition | Formulation 1 | Formulation 2 |
|---|---|---|
| Roflumilast | 0.3 or 0.15 | 0.3 or 0.15 |
| Petrolatum, USP | 5.0 | 10.0 |

TABLE 6-continued

| Foam Concentrate Composition | Formulation 1 | Formulation 2 |
|---|---|---|
| Isopropyl Palmitate, NF | 2.5 | 5.0 |
| Crodafos CES | 2.0 | 2.0 |
| cetostearyl alcohol | NMT 1.6 | NMT 1.6 |
| dicetyl phosphate | NMT 0.4 | NMT 0.4 |
| ceteareth-10 phosphate | NMT 0.4 | NMT 0.4 |
| Diethylene Glycol Monoethyl Ether, NF (Transcutol P) | 25.0 | 25.0 |
| Hexylene Glycol, NF | 2.0 | 2.0 |
| Methylparaben, NF | 0.20 | 0.20 |
| Propylparaben, NF | 0.050 | 0.050 |
| 1N NaOH, NF | q.s. ad pH 5.5 | q.s. ad pH 5.5 |
| Purified Water, USP | q.s. ad 100% | q.s. ad 100% |

Eight different hydrocarbon propellants, a 47/53 wt/wt blend of N-Butane/dimethyl ether and the hydrofluorocarbon HFA 134a were added to the foam concentrate [either Formulation 1 or Formulation 2] listed in Table 6 and the emitted foam appearance was noted after gentle shaking of the canister. Target proportions were 5 grams propellant added to 62 grams foam concentrate. As seen in Table 7, the use of either N-Butane or Isobutane alone as a propellant and blends of propane and isobutane produced a runny product that were not aesthetically acceptable. However, a Propane/Isobutane/N-Butane blended propellant produced an emitted foam that was smooth, white and uniform. This foam using the three-hydrocarbon propellant blend initially supported its own weight but readily broke during rub-in. The addition of isopentane to the Propane/Isobutane/N-Butane propellant blend destabilized the emitted foam and produced a runny looking product.

Dimethyl ether is commonly added to a hydrocarbon propellant to increase solubility in the canister of water-insoluble actives, especially if the foam concentrate contains alcohol (ethanol or isopropyl alcohol). As seen in Table 7, the addition of dimethyl ether to N-butane resulted in a runny looking product upon dispensing that did not meet appearance requirements.

HFA-134a (1,1,1,2-tetrafluoroethane), the propellant used in highly water-soluble urea (KERAFOAM® 42) and salicylic acid (SALKERA®) emollient foams, was combined with Formulation 1. The emitted product was a clumpy, gelatinous looking material that did not comprise gas bubbles distributed in a liquid.

TABLE 7

| Propellant | Tradename | Foam Appearance |
|---|---|---|
| Isobutane | Aeropres A-31 | |
| N-Butane | Aeropres A-17 | This propellant resulted in a runny looking product upon dispensing that did not meet appearance requirements for a foam. |
| Propane/Isobutane | Aeropres A-46 | This propellant resulted in a runny looking product upon dispensing that did not meet appearance requirements for a foam. |
| Propane/Isobutane | Aeropres A-70 | This propellant resulted in an acceptable stiff foam (see FIG. 1C). with bubbles that were very small and uniform in sizeFoam looked good and bubbles seemed to remain very small after several minutes. Can filled with 64.2 g bulk and 4.9 g propellant. Pressure: 75 psi |

TABLE 7-continued

| Propellant | Tradename | Foam Appearance |
|---|---|---|
| Propane/Isobutane/ N-Butane | Aeropres AP-70 | This propellant resulted in an acceptable, smooth, white, stiff foam product (see FIG. 1C) having bubbles that were small and uniform in size. The foam supported its own weight upon dispensing but readily broke during rub-in. |
| Propane/Isobutane/ N-Butane | Aeropres AP-48 | This propellant resulted in an acceptable, smooth, white, stiff foam product (see FIG. 1C) having bubbles that were small and uniform in size. The foam supported its own weight upon dispensing but readily broke during rub-in. |
| blend of Propane/Isobutane/ N-Butane having a vapor pressure of 35 psig at 70° F. such as the ration of Isobutane to N-Butane is fixed at 2/3 | Aeropin 35 AP-35 | This propellant resulted in bubbles that were very small and uniform in size. An acceptable stiff foam (see FIG. 1C) was produced. No sputtering was observed. Can filled with 62.6 g bulk and 5.5 g propellant. Pressure: 56 psi |
| 53% Dimethyl Ether (DME) and 47% N-Butane | n/a | Runny looking product upon dispensing that did not meet appearance requirements far a foam. |
| 1,1,1,2-tetrafluoroethane | HFA 134a | Propellant did not mix well with the product and produced a clumpy, gelatinous looking product when dispensed. Did not meet appearance requirements for a foam. |

Example 2

Determining the Dispersed Content Uniformity Throughout Canister Life

The appearance of 64 grams foam concentrate (Formulation 1 containing 0.15% roflumilast) when gassed with 5, 6, 8 or 10 grams of AP-70 propellant were compared. The emitted foam appearance for these four foam concentrate to propellant ratios was indistinguishable smooth, white foam products having gas bubbles that were small and uniform in size.

Additional analytical testing was completed on formulation 1 (containing 0.3% roflumilast) to determine dispersed roflumilast content uniformity throughout the canister life. Two clinically relevant doses (~1 gram) were dispensed from the beginning of the can (initial actuations after ~5 hand shakes of the can). The amount of foam dispensed was quantified by completing a difference weighing of the can and the assay results of the two separate foam extractions were averaged to give the "Beginning Average" value. 15 grams of foam was dispensed, and the canister was allowed to return to room temperature. An additional 5-6 hand shakes of the canister was followed by dispensing two clinically relevant doses (~1 gram) from the middle of the canister. Assay results of the two separate foam extractions were averaged to give the "Middle Average" value. An additional 15 grams of foam was dispensed, the canister allowed to return to room temperature. This sequence of sampling was repeated to give the "End Average" data. Data comparing the "Beginning Average", Middle Average" and "End Average" for lot PGX-C containing 10 grams of AP-70 propellant compared to a lot that contains 8 grams of AP-70 propellant is shown in Table 8.

According to USP<607> Pharmaceutical Foams—Product Quality Tests the dispersed content uniformity throughout canister life must not exceed 10%. This compendial method instructs to dispense quantities according to the labeled instructions separately collecting an appropriate amount of individually weighed foam drug product. The sample size should not exceed the maximum dose recommended by the product labeling for a single application. The labeled use instructions determine if the can should be shaken prior to expelling foam and the orientation (upright or inverted) when dispensing. Portions of foam should be retained corresponding to: 1) an initial portion from the filled canister, 2) a portion from the middle of the canister (in the range of 40%-60% of labeled canister content), and 3) the portion corresponding to the canister contents with 85% of the labeled contents delivered. The canister should be dispensed at room temperature. If the canister cools as a result of dispensing, the canister should be warmed to room temperature before subsequent delivery. Using an appropriate sample preparation (such as outgassing) and analytical method, the drug substance concentration in each of the three portions can be determined. None of the three results were outside of the product assay range. The maximum difference in the amount of active ingredient determined within the canister is NMT 10.0% beginning, middle and end.

As seen in Table 8, addition of 10 grams of HC propellant destabilizes the O/W emulsion in the canister. When the canister is shaken, the liquid propellant (specific gravity=0.54) mixes with the internal oil phase (petrolatum/ isopropyl palmitate/cetostearyl alcohol–specific gravity=0.83) and causes the now swollen emulsion globules to rise (creaming of the emulsion) away from the inverted valve/actuator. Since the water insoluble active disproportionately resides surrounding the oil phase of the emulsion, repeating this process of shaking the canister and emitting the foam serves to concentrate active in the canister. When the O/W emulsion is destabilized to the point of exceeding the maximum difference limit (not more than 10%) specified for content uniformity throughout canister life according to USP<607>, the aerosol foam drug product is no longer commercially viable. For a target 64-gram fill of 0.3% roflumilast Formulation 1, increasing the amount of AP-70 hydrocarbon propellant, suddenly and unexpectantly destabilized the emulsion of the foam concentrate to make this foam drug product no longer acceptable for commercial pharmaceutical products.

TABLE 8

| Formulation 1 foam concentrate with a target fill weight of 64 grams | Beginning Average | Middle Average | End Average | % RSD | Maximum Difference |
|---|---|---|---|---|---|
| 10 grams HC Propellant (EKG S190275) | 93.3% | 94.5% | 105.4% | 6.8% | 12.1% |
| 8 grams HC Propellant (EKG S200148) | 92.6% | 94.8% | 98.2% | 3.0% | 5.6% |

HC Propellant is a blend of 31% Propane, 23% Isobutane and 46% n-butane

Example 3

Effect of Increasing the Concentration of Diethylene Glycol Monoethyl Ether

Using the same USP<607> Pharmaceutical Foams-Product Quality Tests as detailed in Example 2 for determining the dispersed content uniformity throughout canister life, the effect of increasing the concentration of diethylene glycol monoethyl ether (Table 9) was determined.

TABLE 9

| Foam Concentrate Composition | Formulation 1 | Formulation 3 | Formulation 4 |
|---|---|---|---|
| Roflumilast | 0.3 | 0.3 | 0.3 |
| Petrolatum, USP | 5.0 | 5.0 | 5.0 |
| Isopropyl Palmitate, NF | 2.5 | 2.5 | 2.5 |
| Crodafos CES | 2.0 | 2.0 | 2.0 |
| cetostearyl alcohol | NMT 1.6 | NMT 1.6 | NMT 1.6 |
| dicetyl phosphate | NMT 0.4 | NMT 0.4 | NMT 0.4 |
| ceteareth-10 phosphate | NMT 0.4 | NMT 0.4 | NMT 0.4 |
| Diethylene Glycol Monoethyl Ether, NF (Transcutol P) | 25.0 | 35.0 | 40.0 |
| Hexylene Glycol, NF | 2.0 | 2.0 | 2.0 |
| Methylparaben, NF | 0.20 | 0.20 | 0.20 |

TABLE 9-continued

| Foam Concentrate Composition | Formulation 1 | Formulation 3 | Formulation 4 |
|---|---|---|---|
| Propylparaben, NF | 0.050 | 0.050 | 0.050 |
| 1N NaOH, NF | q.s. ad pH 5.5 | q.s. ad pH 5.5 | q.s. ad pH 5.5 |
| Purified Water, USP | q.s. ad 100% | q.s. ad 100% | q.s. ad 100% |

When the O/W emulsion is destabilized to the point of exceeding the maximum difference limit (not more than 10%) specified for content uniformity throughout canister life in USP<607>, the aerosol foam drug product is no longer commercially viable. For a target 64-gram fill of 0.3% roflumilast foam concentrate and 8-gram fill of AP-70 hydrocarbon propellant, the emulsion in the canister suddenly and unexpectantly destabilizes when the DEGEE concentration is increased from 35% to 40% (Table 10). The emulsion of this foam drug product containing 40% DEGEE is not acceptable for pharmaceutical commercialization.

TABLE 10

| Foam concentrate (target fill weight of 64 grams) blended with 8 grams of AP-70 | Beginning Average | Middle Average | End Average | % RSD | Maximum Difference |
|---|---|---|---|---|---|
| FORMULATION 1 (EKG S190148) | 92.6% | 94.8% | 98.2% | 3.0% | 5.6% |
| FORMULATION 3 (EKG S200075) | 97.2% | 99.6% | 100.7% | 1.8% | 3.2% |
| FORMULATION 4 (EKG S200078) | 96.4% | 99.0% | 131.3% | 17.9% | 34.9% |

Example 4

As detailed in Example 2, two clinically relevant doses (~1 gram) were dispensed from the beginning, middle and end of the can. The amount of foam dispensed was quantified by completing a difference weighing of the can and the assay results of the two separate foam extractions were averaged to give the beginning average (B), middle average (M) or end average (E) values shown in Table 10. After each pair of clinically relevant actuations, approximately 15 grams of foam was dispensed into a glass container, tightly closed, and stored for optional assay. These samples were labeled as the beginning retain (BR), middle retain (MR) and end retain (ER). The six assay values (which represents assay of the entire contents of the canister) for FORMULATION 4 from Table 9 is shown in Table 11.

TABLE 11

| | Beginning | Beginning Retain | Middle | Middle Retain | End | End Retain |
|---|---|---|---|---|---|---|
| FORMULATION 4 | 96.4% | 69.4% | 99.0% | 72.2% | 131.3% | 111.0% |

The data shown in Table 11 provides a dramatic example of how creaming of a foam concentrate emulsion within the canister can cause dramatic changes in dosing levels of active to the patient. From development of roflumilast emulsion formulations it is known that increasing the amount of DEGEE from 25% to 40% will increase the solubility of roflumilast in the foam concentrate, but increasing DEGEE above 35% also destabilizes the emulsion. The assay pattern after fully assaying the canister (Table 11) indicates that active is migrating to the portion of the emulsion containing roflumilast that is being retained in the canister during actuation. By walking through the assay steps, the data from Table 11 can be understood. The full can of product is shaken, and the beginning one-gram samples are dispensed with an assay value of 96.4%. The can is again shaken and approximately 15-grams of foam is dispensed into a jar in a single actuation—the roflumilast-rich, propellant swollen globules of the destabilized emulsion phase separate (creaming) and migrate away from the valve of the inverted canister. Creaming of the emulsion carries a disproportionate amount of roflumilast toward the interface between the emulsion and liquid propellant which assures that the "Beginning Retain" has a very low assay value of 69.4%. The can is allowed to return to room temperature, shaken and the short actuation, 1-gram middle samples are taken and assayed at 99.0% of label. Once again, due to the destabilized emulsion, roflumilast evades being dispensed from the canister during the long actuation during dispensing of the "Middle Retain" (72.2% of label). With about two-thirds of the three-phase pharmaceutical aerosol having been dispensed at low potency, the 1-gram end actuations have the highest assay value of 131.3% of label. The final long actuation to produce the "End Retain" assay value maintains the trend of having a lower roflumilast assay value (111.0% label) compared to end sample (131.3% label). Depending on how long the canister is held inverted after shaking, a physically unstable emulsion foam product could deliver 69% of the labeled dose or 131% of the labeled dose. Formulation 4 would not be suitable as a commercially viable pharmaceutical aerosol foam product.

Example 5 Ratio of the Hydrocarbon Blend

The aesthetics of ARQ-154 foam formulation shown in Table 2 (64 grams concentrate) when gassed with 8 grams of either AP-48 or AP-70 propellant were compared. The AP-48 propellant is a 31:23:46 Propane:Isobutane:N-Butane blend while AP-70 propellant is a 55:15:30 blend of Propane:Isobutane:N-Butane. While both foams were found completely acceptable, the firmer appearance and slightly slower breaking of the AP-48 propellant foam was preferred by about two-thirds of the individuals testing the products. The other third of the testers had either no preference or a slight preference for the quicker breaking AP-70 foam. It was concluded that both the AP-48 and AP-70 hydrocarbon blends show good topical foam characteristics and excellent aesthetics. By adjusting the ratio of propane to the isobutane: N-Butane mixtures, any pressure between 48 and 70 psig can be achieved. In terms of aesthetics, any ratio of the hydrocarbon propellant blend of Propane/Isobutane/N-Butane that gives a pressure around 48-70 psig at 70° F. has been shown acceptable.

Example 6

Roflumilast Foam Phase 2 Clinical Re-Supply-4% Roflumilast Overage Batch

The analytical method used to quantify roflumilast in foam drug product was developed and validated using fresh roflumilast foam. As stability studies for the roflumilast foam drug product were completed, it was observed that the roflumilast assay values decreased with time without a corresponding increase in known roflumilast degradation products or increase in unknown chromatographic peaks. Further investigation confirmed that roflumilast was not degrading in the foam product, but rather that the original extraction conditions found adequate for fresh foam drug product samples did not fully extract roflumilast from aged foam drug product. A new sample preparation method that includes a hexane:acetonitrile extraction step was validated and used to characterize the 3 month stability time point for lots PGW-C and PGX-C (duplicate GMP batches of 0.3% roflumilast foam manufactured at DPT Laboratories, San Antonio TX).

The 200-kg bulk concentrate for lots PGW-C and PGX-C had six-point sampling (Top Center, Top Edge 0°, Top Edge 180°, Middle Center, Middle Edge 0° and Bottom). Assay data for the bulk concentrate is shown in Table 12 below. The bulk concentrate is added to the aerosol can, the valve is crimped on the can, the propellant is added to the can through the valve and finally the actuator/cap assembly is snapped into place.

In the first step of the packaged foam drug product sample preparation, all the propellant is removed from the foam sample, the hexane:acetonitrile extraction is completed and the concentration of roflumilast in the foam product minus propellant (the same matrix as the bulk concentrate) is calculated. As shown in Table 12 below, on average a 4% loss in potency (% label) occurs between the concentrate being added to the can (prior to addition of the propellant) and removal from the can (for stability testing).

TABLE 12

Assay results (whole can assay method) that were used to justify a 4% overage of roflumilast.

| Lot Number | Roflumilast (% label) before propellant | Roflumilast (% label) after propellant (3-month timepoint n = 3) 25° C. upright | 25° C. inverted | 40° C. upright | 40° C. inverted |
|---|---|---|---|---|---|
| PGW-C | 96.9 | 92.3 (4.4% loss) | 93.0 (3.7% loss) | 94.2 (2.7% loss) | 91.5 (5.4% loss) |
| PGX-C | 98.8 | 93.9 (4.9% loss) | 95.3 (3.5% loss) | 95.2 (3.6% loss) | 94.2 (4.6% loss) |

A 525 kg GMP batch of roflumilast foam bulk concentrate was manufactured that contained a 4% overage of roflumilast. The lot number for this overage batch was RDS-C. Using the validated method (sample preparation includes the hexane:acetonitrile extraction step) release testing results were 101.9% of label (0.3% roflumilast) for cans from the beginning of the packaging run, 100.1% label from the middle of the packaging run, and 100.1% of label from the end of the packaging run. The apparent loss in assay value for the roflumilast foam was corrected by adding a 4% overage of roflumilast during compounding of the bulk concentrate.

Example 7 Content Uniformity of Emitted Foam Doses

Two clinically relevant doses (~1 gram) were dispensed from the beginning of the can (initial actuations after ~5 hand shakes of the can). The amount of foam dispensed was quantified by completing a difference weighing of the can and the assay results of the two separate foam extractions were averaged to give the "Beginning Avg" value. Approximately 15 grams of foam was dispensed into a glass container, tightly closed and stored for optional assay as the "Beginning Retain" sample at a later date. This sequence of sampling was repeated to give the "Middle Avg" and "End Avg" data. After the two clinically relevant doses were dispensed from the end of the can, all remaining foam was dispensed from the can to give the "End Retain" sample. The assay results for these 6 emitted doses are shown in Table 13. All emitted foam doses were within specification, the low assay results (3.5%-4.9/o assay loss) using the "whole can" assay for lot PGX-C (Table 12) were only seen in this content uniformity study for foam doses emitted from the actuations from the beginning of the can. The high RSD values for the content uniformity results combined with smaller percent assay losses prompted an experimental design that examined order of addition, composition, and propellant modifications of the roflumilast foam used in the Phase 2 clinical trials.

TABLE 13

Content uniformity results for the roflumilast foam Phase 2 clinical lot PGX-C (no overage).

| Clinical lot PGX-C | Beginning Avg | Middle Avg | End Avg | % RSD |
|---|---|---|---|---|
| S190275 Can 1 | 93.3% | 94.5% | 105.4% | 6.8% |
| S190275 Can 2 | 91.1% | 95.3% | 99.1% | 4.2% |
| S190275 Can 3 | 94.0% | 94.7% | 99.3% | 3.0% |

The process modification batches were 1720-0204R01 (the '204 batch) and 1720-0206R01 (the '206 batch). In the '204 batch the active phase (DEGEE, parabens and roflumilast) was blended into the oil phase prior to emulsification. In the '206 batch the emollient isopropyl palmitate was not added to the Crodafos CES and petrolatum oil phase, rather it was held back and dissolved into the DEGEE of the active phase, which was added to the batch after emulsification. Both of these "order of addition" process changes for the product concentrate were gassed with AP-70 propellant. As shown in Table 14, combining the oil and active phases prior to emulsification resulted in dramatically lower, out of specification assay values and had an RSD of 6.2%. This contrasts with batch '206 (IPP added to the active phase) that gave assay values ranging from 96-100% with an RSD of 2.1%. Addition of IPP to the active phase was a process change made to the roflumilast foam Phase 3 test article.

Four composition changes were made, increasing hexylene glycol to 4% (DPT lot 1720-0205R01) increasing IPP to 5% (DPT lot 1720-0213R01), increasing DEGEE to 35% (DPT lot 1720-0123R01) and increasing DEGEE to 40% (DPT lot 1720-0211 R01). While increasing DEGEE to 35% had higher average assay values and low % RSD when gassed with AP-70, increasing DEGEE to 40% resulted in a very non-homogeneous emitted foam. The results for the '123 and '211 batches indicated that addition of too much DEGEE (between 35% and 40%) caused sudden product failure.

A sample of product concentrate having Table 2 composition was gassed with AP-48 and AP-31 (isobutane only) propellants. While both lower pressure propellants had low assay values in line with PGX-C whole can assay results, AP-31 had an RSD of 1.4% and AP-48 had an RSD of 0.6%. The appearance of the '123 batch using only DME as the propellant and the known incompatibility of DME with aerosol filling equipment resulted in DME no longer being considered as a propellant for the roflumilast foam product.

As stated above the aesthetics of roflumilast foam gassed with 8 grams of either AP-48 or AP-70 propellant were compared. Bath foams were found completely acceptable with the firmer appearance and slightly slower breaking of the AP-48 propellant foam being preferred by about two-thirds of the individuals testing the products. The other third of the testers had either no preference or a slight preference for the quicker breaking AP-70 foam.

TABLE 14

The impact of process, composition and propellant modifications on roflumilast foam content uniformity data.

| Appearance | DPT Lot Number | Propellant | Composition/Process Change | Average Assay % label | % RSD | Actual % API |
|---|---|---|---|---|---|---|
| Matched Table 2 composition gassed with AP-70 | 1720-0204R01 | AP-70 | Active Phase added into Oil Phase | 89.9% (B) 93.9% (M) 83.0% (E) | 6.2 | 0.300% |
| | 1720-0205R01 | AP-70 | Increased Hexylene Glycol from 2% to 4% | 95.7% (B) 97.6% (M) 99.0% (E) | 1.7 | 0.300% |
| | 1720-0206R01 | AP-70 | Isopropyl Palmitate added to Active Phase | 95.9% (B) 97.7% (M) 100.0% (E) | 2.1 | 0.300% |
| | 1720-0213R01 | AP-70 | Isopropyl Palmitate increased to 5.0% | 96.0% (B) 96.7% (M) 97.9% (E) | 1.0 | 0.301% |

TABLE 14-continued

The impact of process, composition and propellant modifications on roflumilast foam content uniformity data.

| Appearance | DPT Lot Number | Propellant | Composition/Process Change | Average Assay % label | % RSD | Actual % API |
|---|---|---|---|---|---|---|
| Slightly softer foam than Table 2 | 1720-0123R01 | AP-70 | Transcutol increased from 25% to 35% | 97.2% (B) 99.6% (M) 100.7% (E) | 1.8 | 0.293% |
| composition gassed with AP-70 | 1639-0528P01 | A-31 | Table 2 Composition | 96.6% (B) 96.8% (M) 94.3% (E) | 1.4 | 0.298% |
| | 1639-0528P01 | AP-48 | Table 2 Composition | 96.2% (B) 97.2% (M) 96.2% (E) | 0.6 | 0.298% |
| | 1720-0211R01 | AP-70 | Transcutol increased to 40% | 96.4% (B) 99.0% (M) 131.3% (E) | 17.9 | 0.301% |
| softest foam with larger bubbles-foam collapsed quickly | 1720-0123R01 | DME | Transcutol increased from 25% to 35% | Not Tested | n/a | 0.293% |

Two clinically relevant doses (~1 gram) were dispensed from the beginning, middle and end of the can. The amount of foam dispensed was quantified by completing a difference weighing of the can and the assay results of the two separate foam extractions were averaged to give the beginning average (B), middle average (M) or end average (E) values shown in Table 14. After each pair of clinically relevant actuations, approximately 15 grams of foam was dispensed into a glass container, tightly closed and stored for optional assay. These samples were labeled as the beginning retain (BR), middle retain (MR) and end retain (ER). Can 1 (clinical lot PGX-C) from Table 13 and batches '205, '206, '528 with AP-48, and '211 from Table 14 were selected for assay of these optional retain samples. It should be noted that by assaying the retain samples, the whole can of the roflumilast foam is being assayed. Results for these 5 lots of roflumilast foam are shown in Table 15.

TABLE 15

| Lot | (B) | (BR) | (M) | (MR) | (E) | (ER) |
|---|---|---|---|---|---|---|
| PGX-C can1 | 93.3 | 103.3 | 94.5 | 95.7 | 105.4 | 107.7 |
| '205 | 95.7 | 96.2 | 97.6 | 97.7 | 99.0 | 90.7 |
| '206 | 95.9 | 96.2 | 97.7 | 100.3 | 100.0 | 111.8 |
| '258 (AP-48) | 96.2 | 95.7 | 97.2 | 97.8 | 96.2 | 97.8 |
| '211 | 96.4 | 69.4 | 99.0 | 72.2 | 131.3 | 111.0 |

Example 8 Can Liner Compatibility Testing

Since introduction of a hexane extraction step significantly decreased variability in assay results, a sampling of commercially available can liners were filled with 0.3% foam concentrate and gassed with AP-70 propellant. Three different can sizes were compared to the glass compatibility bottle. The current roflumilast foam 60 gram can was compared to the larger Trivium Cans (PPG-2845 and PPG-8900) that were 53 mm×235 mm cans filled with 275.2 grams concentrate (equivalent to 64 g concentrate for the 60 gram can) and 34.4 grams of AP-70 propellant (equivalent to 8 g or propellant for the 60 gram can). The smaller roflumilast foam 10 gram sample can was filled with 12.0 g concentrate and 2.3 g AP-70 propellant. The bulk concentrate was packaged, and propellant added. The cans were stored inverted and upright at ambient conditions. Bottles were gassed and sent the same days, but were stored upright and horizontal. The assay results for roflumilast, methylparaben and propylparaben are shown in Table 16.

TABLE 16

Results from can liner compatibility study after ambient storage for over one month.

| Sample ID and Description | Storage Orientation | Average % Label Claim Roflumilast | % RSD | Average % Label Claim MP | % RSD | Average % Label Claim PP | % RSD |
|---|---|---|---|---|---|---|---|
| S200145 Bulk Product | N/A | 100.8 | 0.03 | 100.5 | 0.3 | 98.7 | 1.9 |
| S200146 Trivium can PPG-8900 | Upright | 97.2 (B) 101.2 (M) 98.7 (E) | 2.0 | 101.9 (B) 104.9 (M) 101.5 (E) | 1.8 | 100.5 (B) 103.4 (M) 100.1 (E) | 1.8 |
| with MPE liner Lot R01-A | Inverted | 93.0 (B) 89.9 (M) 96.4 (E) | 3.5 | 96.6 (B) 92.3 (M) 98.8 (E) | 3.4 | 96.3 (B) 90.9 (M) 98.7 (E) | 4.2 |
| S200147 Trivium can | Upright | 92.5 (B) 95.8 (M) | 1.9 | 93.7 (B) 97.9 (M) | 2.3 | 92.4 (B) 95.7 (M) | 1.7 |

TABLE 16-continued

Results from can liner compatibility study after ambient storage for over one month.

| Sample ID and Description | Storage Orientation | Average % Label Claim Roflumilast | % RSD | Average % Label Claim MP | % RSD | Average % Label Claim PP | % RSD |
|---|---|---|---|---|---|---|---|
| PPG-2845 with BPA liner Lot R01-B | Inverted | 93.0 (E) 95.2 (B) 92.7 (M) 93.0 (E) | 1.3 | 94.7 (E) 96.2 (B) 93.9 (M) 93.9 (E) | 1.4 | 94.0 (E) 94.3 (B) 91.7 (M) 92.4 (E) | 1.5 |
| S200148 RM#146427 Current ARQ-154 60 g can with PAM liner Lot R01-C | Upright<br><br><br>Inverted | 92.6 (B) 94.8 (M) 98.2 (E) 93.9 (B) 85.1 (M) 99.5 (E) | 3.0<br><br><br>3.1 | 95.2 (B) 96.3 (M) 97.7 (E) 94.9 (B) 95.5 (M) 97.6 (E) | 1.3<br><br><br>1.5 | 94.0 (B) 95.9 (M) 97.3 (E) 94.3 (B) 95.2 (M) 96.2 (E) | 1.7<br><br><br>1.0 |
| S200149 RM#146297 60 g can with an epoxy phenolic liner Lot R01-D | Upright<br><br><br>Inverted | 94.0 (B) 92.5 (M) 96.2 (E) 93.1 (B) 93.5 (M) 99.5 (E) | 2.0<br><br><br>3.7 | 95.8 (B) 95.6 (M) 96.6 (E) 94.7 (B) 95.4 (M) 97.0 (E) | 0.5<br><br><br>1.2 | 94.0 (B) 94.2 (M) 96.0 (E) 93.8 (B) 94.1 (M) 95.2 (E) | 1.2<br><br><br>0.8 |
| S200150 RM#146419 10 g can with an epoxy phenolic liner (current) Lot R01-E | Upright<br><br><br>Inverted | 98.1 (B) 100.1 (M) 96.1 (E) 97.7 (B) 98.6 (M) 96.5 (E) | 2.0<br><br><br>1.1 | 95.7 (B) 95.3 (M) 92.4 (E) 92.8 (B) 92.8 (M) 93.5 (E) | 1.9<br><br><br>0.4 | 90.6 (B) 91.6 (M) 88.5 (E) 88.1 (B) 87.7 (M) 90.6 (E) | 1.7<br><br><br>1.8 |
| S200151 Glass Bottle Lot R01-F | Upright<br><br><br>Horizontal | 94.2 (B) 90.3 (M) 94.3 (E) 92.7 (B) 93.5 (M) 90.7 (E) | 2.5<br><br><br>1.6 | 96.0 (B) 93.8 (M) 96.9 (E) 94.9 (B) 95.4 (M) 94.8 (E) | 1.7<br><br><br>0.3 | 93.9 (B) 91.5 (M) 94.0 (E) 92.7 (B) 92.7 (M) 93.1 (E) | 1.5<br><br><br>0.3 |

Variability in the results and the lower than expected values for the glass bottle samples makes it difficult to precisely determine loss to the can liner. However, trends in the data indicate that in terms of retaining near target roflumilast values the epoxy phenolic liner is best, MPE and BPA are similar, but slightly inferior to the epoxy phenolic liner and the current PAM liner is the least compatible liner for the roflumilast foam product. From the data in Table 16 it appears the epoxy phenolic liner may not be compatible with the parabens, especially propyl paraben. If this incompatibility between the preservatives and the epoxy phenolic can liner is confirmed, an overage of roflumilast may be required to compensate for the slight roflumilast loss due to use of the PAM can liner in the primary container for the roflumilast foam.

Example 9 Roflumilast Foam Final Formulation Experiment

To select the final roflumilast formulation for the manufacture of the three primary stability batches, a matrix of four packaging/propellant combinations is being placed on stability. The four configurations are: 1) current PAM lined can gassed with the AP-70 propellant (The phase 2 IP), 2) current PAM lined can gassed with the AP-48 propellant, 3) epoxy phenolic lined can gassed with AP-70 propellant and 4) epoxy phenolic can gassed with AP-48 propellant. The product concentrate will have the composition shown in Table 2 with the IPP added to the active phase during processing. Target fill weights will be 64.0 grams for the product concentrate and 8.0 grams for the propellant. Forty (40) cans of each of the four configurations will be filled, gassed and placed on stability. Three (3) cans from each configuration will be pulled at each time and tested for assay, impurities, and preservatives.

Example 10 Storage Stability

The following formulations were prepared and mixed with propellant AP-48 or AP-70 to determine whether a stable foam is formed after storage under ambient conditions for more than 30 days.

TABLE 17

| | Concentration in Product Concentrate (% w/w) | | | |
|---|---|---|---|---|
| Ingredient | Formulation 5 | Formulation 6 | Formulation 7 | Comparative Vehicle Formulation |
| Roflumilast | 0.3% | 0.3% | 0.3% | — |
| DEGEE (Transcutol P) | 25 | 25 | 25 | 25 |
| Petrolatum | 5.0 | 5.0 | 10.0 | 5.0 |
| Isopropyl Palmitate | 2.5 | 2.5 | 5.0 | 2.5 |
| CRODAFOS ™ CES | 2.0 | 2.0 | 2.0 | 2.0 |
| cetearyl alcohol | NMT 1.6 | NMT 1.6 | NMT 1.6 | NMT 1.6 |
| dicetyl phosphate | NMT 0.4 | NMT 0.4 | NMT 0.4 | NMT 0.4 |
| ceteareth-10 phosphate | NMT 0.4 | NMT 0.4 | NMT 0.4 | NMT 0.4 |
| Hexylene Glycol | 2 | 2 | 2 | 2 |
| Methylparaben | 0.2 | 0.2 | 0.2 | 0.2 |
| Propylparaben | 0.05 | 0.05 | 0.05 | 0.05 |
| Purified Water | q.s. ad 100% | q.s. ad 100% | q.s. ad 100% | q.s. ad 100% |
| Propellant | About 1:8 to 1:6 blend of propellant to product concentrate | | | |
| Propane/Isobutane/Butane | AP-48 | AP-70 | AP-70 | AP-70 |

Example 11 Evaluation of Foam Quality

Foams were prepared and assessed using foam quality and foam expansion techniques. The foam concentrate roflumilast formulations comprised formulations with and without hexylene glycol as shown below.

TABLE 18

| | Concentration in Product Concentrate (% w/w) | |
|---|---|---|
| Ingredient | Formulation 5 | Formulation 8 |
| Roflumilast | 0.3% | 0.3% |
| DEGEE (Transcutol P) | 25 | 25 |
| Petrolatum | 5.0 | 5.0 |
| Isopropyl Palmitate | 2.5 | 2.5 |
| CRODAFOS ™ CES | 2.0 | 2.0 |
| cetearyl alcohol | NMT 1.6 | NMT 1.6 |
| dicetyl phosphate | NMT 0.4 | NMT 0.4 |
| ceteareth-10 phosphate | NMT 0.4 | NMT 0.4 |
| Hexylene Glycol | 2 | 0 |
| Methylparaben | 0.2 | 0.2 |
| Propylparaben | 0.05 | 0.05 |
| Purified Water | q.s. ad 100% | q.s. ad 100% |

Aerosol can components were prepared according to the following table.

TABLE 19

| Aerosol Components Utilized | Description |
|---|---|
| 35 mm × 125 mm Can | AER PAM 8460N |
| Stem | S90, 018, (630EQL) Splined |
| Stem Gasket | S90, BUNA, B1785 Non-Food Grade |
| Spring | S90, STEM, 020, Stainless Steel |
| Body | S90, Housing Inverted W/Tail Piece 4 Slot |
| Mounting Cup | Aluminum Spherical Cup, Epon T/B |
| Dip Tube | STD, LLDPE, 0.122 Nat 5K FT |

The sample variable tolerances were as follows.

TABLE 20

| Variable | Minimum | Target | Maximum |
|---|---|---|---|
| Bulk foam concentrate Fill Weight | 60.8 g | 64.0 g | 67.2 g |
| Propellant Fill Weight | 7.6 g | 8.0 g | 8.4 g |
| Crimp Height | 0.208" | 0.210" | 0.212" |
| Crimp Diameter | 1.065" | 1.07" | 1.075" |

N=3 samples were prepared for each variable. Each can was filled with 64 g of the intermediate containing roflumilast, followed by crimping. The cans were subsequently pressurized with 8 g of NIP-70 propellant. The propellant was filled manually using a burette system followed by weight analysis of individual samples. A +/−5% range from the target weights was deemed acceptable. No sample deviated more than 3% from the target values. The finished aerosol products utilized 75% of the specified can's brim filled capacity. The finished cans were tested for leaks by submerging in a water bath at 55° C. for 10 minutes. No leaks were detected during visual inspection of the submerged cans. The finished cans were shaken by hand for no more than 10 seconds and allowed to rest for at least 2 days to ensure complete mixing of the propellant and foam concentrate.

The samples were studied using visual analysis to determine the presence or absence of a foam after dispensing. A foam was defined as the visual presence of multiple bubbles sharing a minimum of 1 liquid film wall which may be broken when agitated by an external force. The foams were visually analyzed immediately after dispensing and again five minutes after dispensing. Both formulation 5 and formulation 8 were found to produce acceptable foams immediately after dispensing and 5 minutes after dispensing. The foams were smooth white or off-white foams having uniform bubbles and were able to support their own weight. The foam half-life was more than 60 seconds. The absence of hexylene glycol did not affect the acceptability of the foam.

The invention claimed is:
1. An aerosol foam comprising an oil-in-water emulsion and a 55:15:30 propane/isobutane/butane propellant blend,
  wherein said oil-in-water emulsion has a viscosity of 4,000-11,000 cP,
  wherein said propellant and said oil-in-water emulsion are in a ratio of about 1:8 to 1:6, and wherein the oil in water emulsion consists of:
  Roflumilast 0.3% w/w
  White Petrolatum 2-6% w/w
  Isopropyl Palmitate 2-3% w/w
  Emulsifier blend comprising cetearyl alcohol, dicetyl phosphate, and ceteareth-10 phosphate 2-4% w/w
  Hexylene glycol 0-4% w/w
  Diethylene glycol monoethyl ether 25-35% w/w
  Paraben preservative(s)
  pH Modifier q.s. ad pH 5.5-6.0
  Purified Water q.s. ad 100.

2. An aerosol foam comprising an oil in water emulsion and a 55:15:30 propane/isobutane/butane propellant blend, wherein said oil in water emulsion has a viscosity of 4,000-11,000 cP, wherein said propellant and oil in water emulsion are in a ratio of about 1:8 to 1:6, and wherein the oil in water emulsion comprises:
  Roflumilast 0.3% w/w
  White Petrolatum 2-6% w/w
  Isopropyl Palmitate 2-3% w/w
  Emulsifier blend comprising cetearyl alcohol, dicetyl phosphate, and ceteareth-10 phosphate 2-4% w/w
  Diethylene glycol monoethyl ether 25-35% w/w
  Paraben preservative(s)
  pH Modifier q.s. ad pH 5.5-6.0
  Purified Water q.s. ad 100.

3. The aerosol foam according to claim 1, wherein said hexylene glycol consists of 2.00% w/w to 4.00% w/w hexylene glycol.

4. The aerosol foam according to claim 3, wherein said parabens consist of 0.2% (w/w) methylparaben and 0.05% (w/w) propylparaben.

5. The aerosol foam according to claim 2, further comprising at least one additional component selected from the group consisting of a solvent, moisturizer, preservative, pH adjusting solution, and skin penetration enhancer.

6. The aerosol foam according to claim 2, wherein said parabens comprises 0.2% (w/w) methylparaben and 0.05% (w/w) propylparaben.

7. The aerosol foam according to claim 1, wherein said white petrolatum consists of 5% (w/w) white petrolatum.

8. The aerosol foam according to claim 1, wherein said aerosol foam has a foam half-life of 30 seconds or more.

9. The aerosol foam according to claim 8, wherein said aerosol foam has a half-life of 5 minutes or more.

10. The aerosol foam according to claim 9, wherein said foam is white in color, and comprises bubbles of substantially uniform size.

11. The aerosol foam according to claim 9, wherein said foam has a density less than 0.15 g/mL.

12. The aerosol foam according to claim 9, wherein said foam retains at least 90% of roflumilast potency after 3 months of storage at 25° C.

13. The aerosol foam according to claim 9, wherein said foam dispenses without sputtering.

14. The aerosol foam according to claim 1, wherein said emulsifier blend consists of 2.0% (w/w) emulsifier blend.

15. The aerosol foam according to claim 14, wherein said hexylene glycol consists of 2% (w/w) hexylene glycol.

16. The aerosol foam according to claim 15, wherein said diethylene glycol monoethyl ether consists of 25.0% (w/w) diethylene glycol monoethyl ether.

17. The aerosol foam according to claim 16, wherein said isopropyl palmitate consists of 2.5% (w/w) isopropyl palmitate.

18. The aerosol foam according to claim 17, wherein said parabens consist of 0.2% (w/w) methylparaben and 0.05% (w/w) propylparaben.

19. The aerosol foam according to claim 18, wherein said emulsion has a pH of 5.5.

* * * * *